US009288494B2

(12) United States Patent
Xu et al.

(10) Patent No.: US 9,288,494 B2
(45) Date of Patent: Mar. 15, 2016

(54) METHODS AND APPARATUS FOR IMPLICIT AND SEMI-IMPLICIT INTRA MODE SIGNALING FOR VIDEO ENCODERS AND DECODERS

(75) Inventors: Qian Xu, El Dorado Hills, CA (US); Joel Sole, Princeton, NJ (US); Yunfei Zheng, Plainsboro, NJ (US); Xiaoan Lu, Princeton, NJ (US); Peng Yin, Ithaca, NY (US)

(73) Assignee: THOMSON LICENSING, Issy les Moulineaux (FR)

( * ) Notice: Subject to any disclaimer, the term of this patent is extended or adjusted under 35 U.S.C. 154(b) by 744 days.

(21) Appl. No.: 13/138,368

(22) PCT Filed: Feb. 5, 2010

(86) PCT No.: PCT/US2010/000321
§ 371 (c)(1),
(2), (4) Date: Aug. 5, 2011

(87) PCT Pub. No.: WO2010/090749
PCT Pub. Date: Aug. 12, 2010

(65) Prior Publication Data
US 2011/0286520 A1 Nov. 24, 2011

Related U.S. Application Data

(60) Provisional application No. 61/150,431, filed on Feb. 6, 2009.

(51) Int. Cl.
*H04N 7/32* (2006.01)
*H04N 19/70* (2014.01)
(Continued)

(52) U.S. Cl.
CPC ... *H04N 19/00884* (2013.01); *H04N 19/00042* (2013.01); *H04N 19/00175* (2013.01); *H04N 19/00278* (2013.01); *H04N 19/00781* (2013.01)

(58) Field of Classification Search
None
See application file for complete search history.

(56) References Cited

U.S. PATENT DOCUMENTS 6,148,027 A 11/2000 Song et al.
6,148,109 A 11/2000 Boon et al.
(Continued)

FOREIGN PATENT DOCUMENTS

CN 1198288 A 11/1998
CN 1810037 A 7/2006
(Continued)

OTHER PUBLICATIONS

Yu et al.: "New Intra Prediction using Intra-Macroblock Motion Compensation," JVT of ISO/IEC MPEG & ITU-T VCEG, Doc.: JVT-C151r1, 3rd Meeting, Fairfax, Virginia, USA, May 6-10, 2002, Doc. Generated: Apr. 30, 2002.
(Continued)

*Primary Examiner* — Dave Czekaj
*Assistant Examiner* — Kehinde O Abimbola
(74) *Attorney, Agent, or Firm* — Robert D. Shedd; Ronald J. Kolczynski

(57) ABSTRACT

Methods and apparatus are provided for implicit and semi-implicit intra mode signaling for video encoders and decoders. An apparatus includes an encoder for encoding picture data for at least a portion of a picture. The encoder derives an intra mode to apply to the portion from neighboring template data and abstains from explicitly signaling the intra mode for the portion. The neighboring template data corresponds to a neighboring template formed from neighboring pixels with respect to the portion.

32 Claims, 19 Drawing Sheets

(51) Int. Cl.
*H04N 19/147* (2014.01)
*H04N 19/61* (2014.01)
*H04N 19/11* (2014.01)
*H04N 19/176* (2014.01)

(56) References Cited

U.S. PATENT DOCUMENTS

| | | | |
|---|---|---|---|
| 6,430,317 B1 | 8/2002 | Krishnamurthy et al. | |
| 7,747,094 B2* | 6/2010 | Sekiguchi et al. | 382/239 |
| 7,843,993 B2* | 11/2010 | Park | 375/240.03 |
| 8,019,169 B2* | 9/2011 | Kondo | 382/236 |
| 8,279,937 B2* | 10/2012 | Seo et al. | 375/240.24 |
| 8,320,467 B2* | 11/2012 | Sato et al. | 375/240.26 |
| 8,325,820 B2* | 12/2012 | Sato et al. | 375/240.26 |
| 8,478,056 B2* | 7/2013 | Lee | 382/232 |
| 2001/0021303 A1* | 9/2001 | Bruls et al. | 386/34 |
| 2003/0152150 A1* | 8/2003 | Fujimoto et al. | 375/240.24 |
| 2004/0184666 A1* | 9/2004 | Sekiguchi et al. | 382/236 |
| 2006/0088097 A1* | 4/2006 | Park | 375/240.03 |
| 2006/0193385 A1 | 8/2006 | Yin et al. | |
| 2007/0019726 A1 | 1/2007 | Cha et al. | |
| 2008/0240576 A1* | 10/2008 | Lee | 382/210 |
| 2008/0304763 A1 | 12/2008 | Nagori | |
| 2009/0034632 A1 | 2/2009 | Chono | |
| 2009/0046779 A1* | 2/2009 | Seok et al. | 375/240.03 |
| 2009/0196350 A1 | 8/2009 | Xiong | |
| 2009/0207913 A1* | 8/2009 | Kim et al. | 375/240.12 |
| 2009/0225861 A1* | 9/2009 | Sato et al. | 375/240.16 |
| 2009/0225862 A1* | 9/2009 | Sato et al. | 375/240.16 |
| 2009/0232206 A1 | 9/2009 | Boon et al. | |
| 2010/0284467 A1* | 11/2010 | Sekiguchi et al. | 375/240.16 |
| 2011/0158319 A1* | 6/2011 | Bae et al. | 375/240.16 |
| 2012/0201475 A1* | 8/2012 | Carmel et al. | 382/238 |
| 2012/0288009 A1* | 11/2012 | Sato et al. | 375/240.16 |
| 2012/0288010 A1* | 11/2012 | Sato et al. | 375/240.16 |
| 2012/0288011 A1* | 11/2012 | Sato et al. | 375/240.16 |

FOREIGN PATENT DOCUMENTS

| | | |
|---|---|---|
| CN | 101222641 A | 7/2008 |
| EP | 2101504 A2 | 9/2009 |
| JP | 2007-116351 A | 5/2007 |
| WO | 2007105614 A1 | 9/2007 |
| WO | 2008048487 A2 | 4/2008 |
| WO | 2009089032 A2 | 7/2009 |

OTHER PUBLICATIONS

International Telecommunication Union: "ITU-T Recommendation H.264," Series H: Audiovisual and Multimedia Systems, iNfrastructure of Audiovisual Services—Coding of moving video, Advanced video coding for generic audiovisual services, Mar. 2005.

Tan et al.: "Intra Prediction by Template Matching," IEEE, ICIP 2006, pp. 1693-1696.

Balle et al.: "Extended Texture Prediction for H.264 Intra Coding," ITU—Telecommunications Standardization Sector, Study Group 16 Question 6, 31st Meeting—Marrakech, MA, Jan. 15-16, 2007, Doc.: VCEG-AE11, pp. 1-7.

Yin et al.: "Localized Weighted Prediction for Video Coding," IEEE, May 23, 2005, pp. 4365-4368.

Zheng et al.: "Intra Prediction Using Template Matching with Adaptive Illumination Compensation," 15th IEEE International Conference on Image Processing, 2008 (ICIP 2008), Oct. 12, 2008, pp. 125-128.

* cited by examiner

METHODS AND APPARATUS FOR IMPLICIT AND SEMI-IMPLICIT INTRA MODE SIGNALING FOR VIDEO ENCODERS AND DECODERS

CROSS-REFERENCE TO RELATED APPLICATIONS

This application claims the benefit, under 35 U.S.C. §365 of International Application PCT/US2010/000321, filed Feb. 5, 2010, which was published in accordance with PCT Article 21(2) on Aug. 12, 2010 in English and which claims the benefit of U.S. provisional patent application No. 61/150,431, filed Feb. 6, 2009.

TECHNICAL FIELD

The present principles relate generally to video encoding and decoding and, more particularly, to methods and apparatus for implicit and semi-implicit intra mode signaling for video encoders and decoders.

BACKGROUND

The International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard") is the first video coding standard that employs spatial directional prediction for intra coding. The MPEG-4 AVC Standard provides a more flexible prediction framework such that the coding efficiency is greatly improved over previous standards in which intra prediction was performed only in the transform domain. In the MPEG-4 AVC Standard, spatial intra prediction is performed using the surrounding available samples, which are the previously reconstructed samples available at the decoder within the same slice. For luma samples, intra prediction can be performed on a 4×4 block basis (denoted as Intra_4×4), an 8×8 block basis (denoted as Intra_8×8), and a 16×16 macroblock basis (denoted as Intra_16×16). Turning to FIG. 1A, MPEG-4 AVC Standard directional intra prediction with respect to a 4×4 block basis (Intra_4×4) is indicated generally by the reference numeral 100. Prediction directions are generally indicated by the reference numeral 110, image blocks are generally indicated by the reference numeral 120, and a current block is indicated by the reference numeral 130. In addition to luma prediction, a separate chroma prediction is conducted. There are a total of nine prediction modes for Intra_4×4 and Intra_8×8, four modes for Intra_16×16, and four modes for the chroma component. The encoder typically selects the prediction mode that minimizes the difference between the prediction and original block to be coded. A further intra coding mode, denoted I_PCM, allows the encoder to simply bypass the prediction and transform coding processes. The intra coding mode I_PCM allows the encoder to precisely represent the values of the samples and place an absolute limit on the number of bits that may be included in a coded macroblock without constraining decoded image quality.

Turning to FIG. 2, an exemplary labeling of prediction samples for Intra_4×4 in the MPEG-4 AVC Standard is indicated generally by the reference numeral 200. In FIG. 2, the samples above and to the left of the current block (labeled with letters, from A to M) have been previously coded and reconstructed and, thus, they are available at the encoder and decoder to form the prediction.

Turning to FIGS. 3B-J, Intra_4×4 luma prediction modes of the MPEG-4 AVC Standard are indicated generally by the reference numeral 300. The samples a, b, c, . . . , p of the prediction block are calculated based on the samples A-M using the Intra_4×4 luma prediction modes 300. The arrows in FIGS. 3B-J indicate the direction of prediction for each of the Intra_4×4 modes 300. The Intra_4×4 luma prediction modes 300 include modes 0-8, with mode 0 (FIG. 3B, indicated by reference numeral 310) corresponding to a vertical prediction mode, mode 1 (FIG. 3C, indicated by reference numeral 311) corresponding to a horizontal prediction mode, mode 2 (FIG. 3D, indicated by reference numeral 312) corresponding to a DC mode, mode 3 (FIG. 3E, indicated by reference numeral 313) corresponding to a diagonal down-left mode, mode 4 (FIG. 3F, indicated by reference numeral 314) corresponding to a diagonal down-right mode, mode 5 (FIG. 3G, indicated by reference numeral 315) corresponding to a vertical-right mode, mode 6 (FIG. 3H, indicated by reference numeral 316) corresponding to a horizontal-down mode, mode 7 (FIG. 3I, indicated by reference numeral 317) corresponding to a vertical-left mode, and mode 8 (FIG. 3J, indicated by reference numeral 318) corresponding to a horizontal-up mode. FIG. 3A shows the general prediction directions 330 corresponding to each of the Intra_4×4 modes 300. In modes 3-8 (corresponding to FIGS. 3E-J), the predicted samples are formed from a weighted average of the prediction samples A-M. In DC mode corresponding to FIG. 3D, the predicted samples are the mean of the prediction samples A to D and I to L. Intra_8×8 uses basically the same concepts as the 4×4 predictions, but with a block size of 8×8 and with low-pass filtering of the predictors to improve prediction performance.

Turning to FIGS. 4A-D, four Intra_16×16 modes corresponding to the MPEG-4 AVC Standard are indicated generally by the reference numeral 400. The four Intra_16×16 modes 400 includes modes 0-3, with mode 0 (FIG. 4A, indicated by reference numeral 410) corresponding to a vertical prediction mode, mode 1 (FIG. 4B, indicated by reference numeral 411) corresponding to a horizontal prediction mode, mode 2 (FIG. 4C, indicated by reference numeral 412) corresponding to a DC prediction mode, and mode 3 (FIG. 4D, indicated by reference numeral 413) corresponding to a plane prediction mode. Each 8×8 chroma component of an intra coded macroblock is predicted from previously encoded chroma samples above and/or to the left. Both chroma components use the same prediction mode. The four prediction modes are very similar to the Intra_16×16, except that the numbering of the modes is different. The modes are DC (mode 0), horizontal (mode 1), vertical (mode 2) and plane (mode 3).

Signaling Intra Prediction Modes

The choice of intra prediction mode for each 4×4 block must be signaled to the decoder and this could potentially require a large number of bits. The MPEG-4 AVC Standard has a particular method to signal the intra mode in order to avoid the use of a large number of bits. Intra modes for neighboring 4×4 blocks are often correlated. To take advantage of this correlation, predictive coding is used in the MPEG-4 AVC Standard to signal 4×4 intra modes. Turning to FIG. 5, exemplary block partitions to which the present principles may be applied are indicated generally by the reference numeral 500. The current block is designated by the reference character "E"). For each current block (e.g., block E in FIG.

5), the encoder and decoder calculate the most probable prediction mode, which is the minimum of the prediction modes of block A and block B. If either of these neighboring blocks is not available (outside the current slice or not coded in Intra4×4 mode), the corresponding mode value for the missing block (A or B) is set to 2 (DC prediction mode).

The encoder sends a flag for each 4×4 block, namely pre_intra4×4_pred_mode. If the flag is equal to 1, the most probable prediction mode is used. If the flag is equal to 0, another parameter rem_intra4×4_pred_mode is sent to indicate a change of mode. If rem_intra4×4_pred_mode is smaller than the current most probable mode, then the prediction mode is set to rem_intra4×4_pred_mode. Otherwise, the prediction mode is set to (rem_intra4×4_pred_mode+1). In this way, only eight values to transmit the chosen rem-intra4×4_pred_mode are used (0 to 7) to signal the current intra mode (0 to 8).

The signaling of Intra8×8 is the same as that of Intra4×4. The prediction mode for luma coding in Intra16×16 mode or chroma coding in intra mode is signaled in the macroblock header and predictive coding of the mode is not used in these cases. Although the most probable mode is simple to compute and reduces the number of bits required for coding the prediction modes, it is not optimal in catching the local variations of block characteristics.

Displaced Intra Prediction (DIP)

During the development of the ITU-T H.26L Standard, displaced intra prediction was proposed. The proposal re-uses the concept of variable block size inter-prediction as specified in the MPEG-4 AVC Standard for intra prediction. Turning to FIG. 1B, an example of displaced intra prediction is indicated generally by the reference numeral 150. The displaced intra prediction 150 involves an intra coded region 152, a current block 154, a candidate block 156, and a displacement vector 158. In general, previously encoded intra regions (e.g., candidate block 156) of a slice can be referenced by displacement vectors (e.g., displacement vector 158) for prediction of the current intra block (e.g., current block 154). The displaced intra prediction 150 is implemented on a macroblock basis. The displacement vectors are encoded differentially using a prediction by the median of the neighboring blocks, in analogy to the inter motion vectors in the MPEG-4 AVC Standard.

Even though the preceding displaced intra prediction approach effectively improves coding efficiency when textures or patterns appear repeatedly in intra coded pictures, the preceding displaced intra prediction approach is limited by the fact that extra bits are required to transmit the value of the displacement vectors.

Template Matching Prediction (TMP)

Template matching prediction is a concept of texture synthesis to deal with the generation of a continuous texture that resembles a given sample.

Intra prediction using template matching in the context of the MPEG-4 AVC Standard has been proposed. In the proposal, the scheme is integrated as an additional mode for Intra4×4 or Intra8×8 prediction in the MPEG-4 AVC Standard. With template matching prediction, self-similarities of image regions are exploited for prediction. Previously encoded intra regions of a slice can be reused for prediction. The TMP algorithm recursively determines the value of current pixels under prediction by selecting at least one patch (of one or more pixels) of decoded data. Patches are selected according to a matching rule, where patch neighboring pixels are compared to current block neighboring pixels, and patches having the most similar neighboring pixels are selected. Turning to FIG. 1C, an example of template matching intra prediction is indicated generally by the reference numeral 170. The template matching intra prediction 170 involves a candidate neighborhood 172, a candidate patch 174, a template 176, and a target 178. Since the search region and the neighborhood (e.g., candidate neighborhood 172) of the current pixels (e.g., target 178) are known at the encoder and the decoder side, no additional side information has to be transmitted, and identical prediction is achieved on both sides. Here, template matching on a 2×2 luma sample grid is applied to enable a joint prediction for luma and chroma samples in 4:2:0 video sequences.

Both displaced intra prediction (DIP) and template matching prediction (TMP) methods search the previously encoded regions in the current picture. However, DIP requires sending the displacement motion vectors while TM does not. TM does an implicit derivation of the displacement vector by means of comparing templates. The implicit derivation saves the bits of transmitting the displacement vectors.

SUMMARY

These and other drawbacks and disadvantages of the prior art are addressed by the present principles, which are directed to methods and apparatus for implicit and semi-implicit intra mode signaling for video encoders and decoders.

According to an aspect of the present principles, there is provided an apparatus. The apparatus includes an encoder for encoding picture data for at least a portion of a picture. The encoder derives an intra mode to apply to the portion from neighboring template data and abstains from explicitly signaling the intra mode for the portion. The neighboring template data corresponds to a neighboring template formed from neighboring pixels with respect to the portion.

According to yet another aspect of the present principles, there is provided a method in a video encoder. The method includes encoding picture data for at least a portion of a picture by deriving an intra mode to apply to the portion from neighboring template data, and abstaining from explicitly signaling the intra mode for the portion. The neighboring template data corresponds to a neighboring template formed from neighboring pixels with respect to the portion.

According to still another aspect of the present principles, there is provided an apparatus. The apparatus includes a decoder for decoding picture data for at least a portion of a picture. The decoder derives an intra mode to apply to the portion from neighboring template data in an absence of receiving any explicit signaling of the intra mode for the portion. The neighboring template data corresponds to a neighboring template formed from neighboring pixels with respect to the portion.

According to a further aspect of the present principles, there is provided a method in a video decoder. The method includes decoding picture data for at least a portion of a picture by deriving an intra mode to apply to the portion from neighboring template data in an absence of receiving any explicit signaling of the intra mode for the portion. The neighboring template data corresponds to a neighboring template formed from neighboring pixels with respect to the portion.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1A:
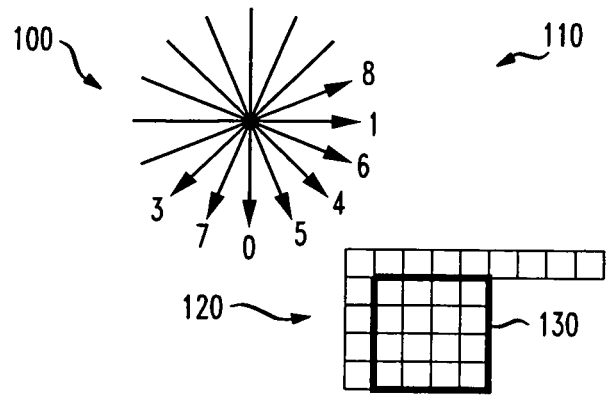
FIG. 1A is a diagram showing MPEG-4 AVC Standard directional intra prediction with respect to a 4×4 block basis (Intra_4×4)
Figure 1B:
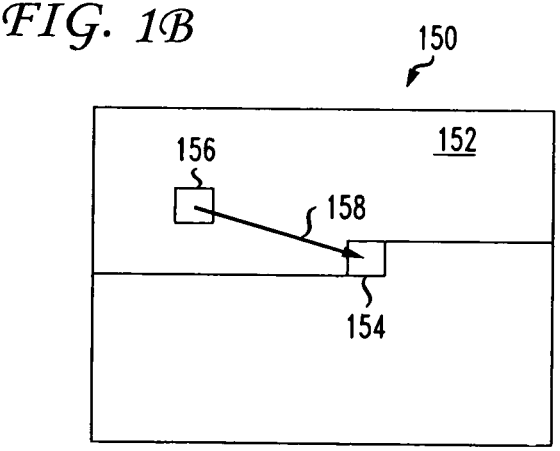
FIG. 1B is a diagram showing an example of displaced intra prediction.
Figure 1C:
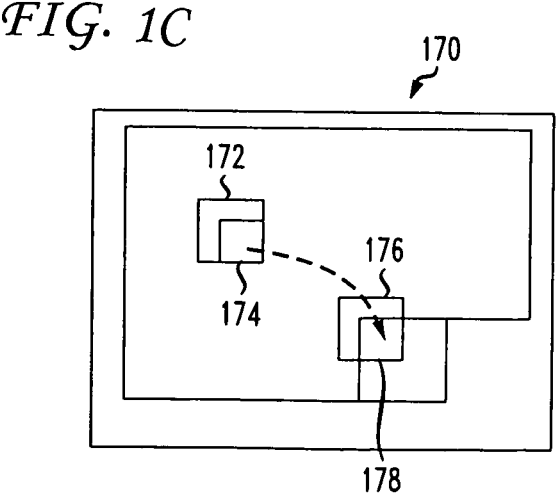
FIG. 1C is a diagram showing an example of template matching intra prediction.
Figures 2, 3A:
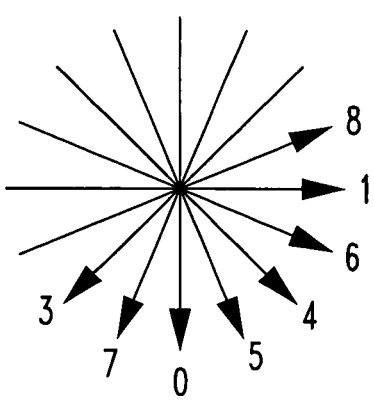
FIG. 2 is a diagram showing labeling of prediction samples for the Intra4×4 mode of the MPEG-4 AVC Standard.
FIGS. 3A-J are diagrams showing Intra_4×4 luma prediction modes of the MPEG-4 AVC Standard.
Figure 3B:
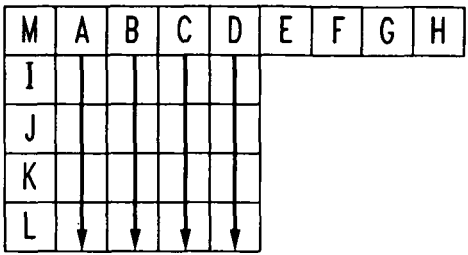
Figure 3C:
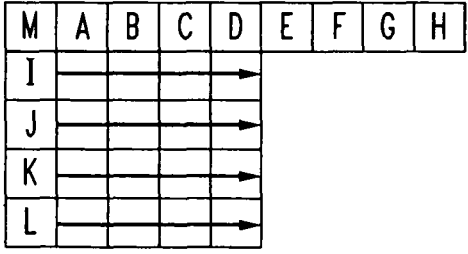
Figure 3D:
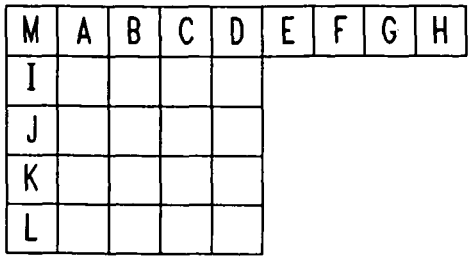
Figure 3E:
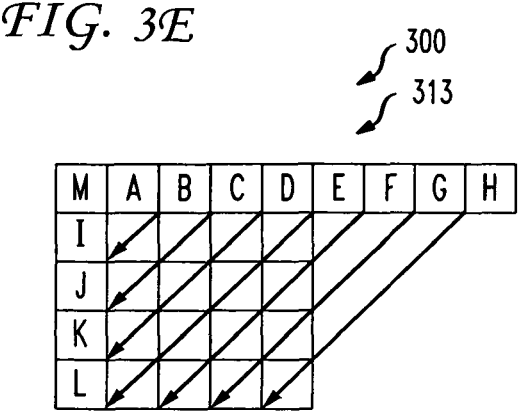
Figure 3F:
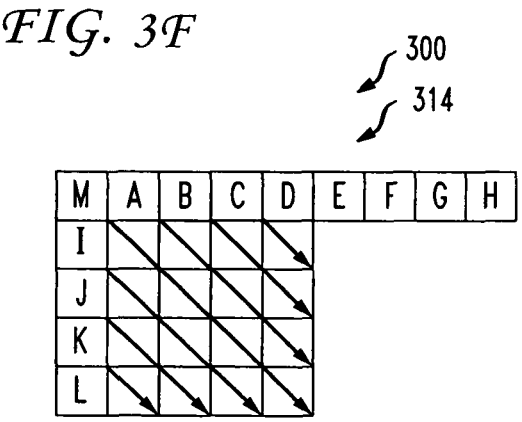
Figure 3G:
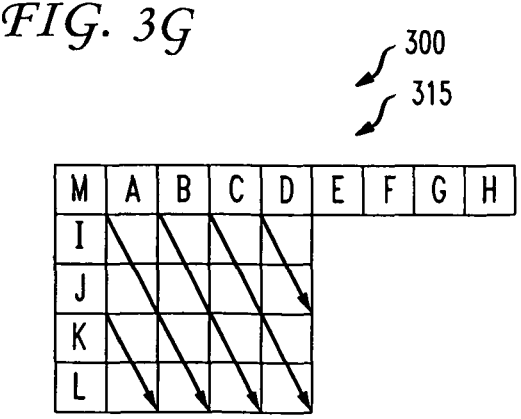
Figure 3H:
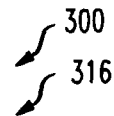
Figure 3I:
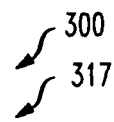
Figure 3J:
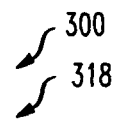
Figure 4A:
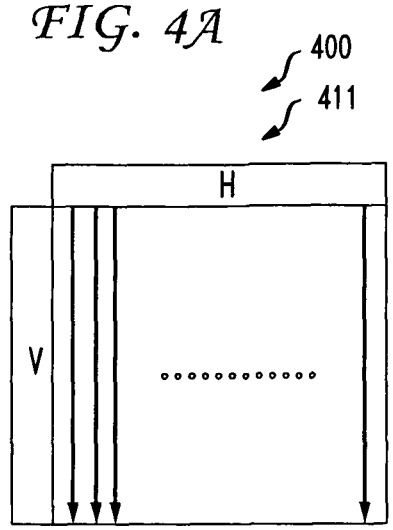
FIGS. 4A-D are diagrams respectively showing four Intra_16×16 modes corresponding to the MPEG-4 AVC Standard.
Figure 4B:
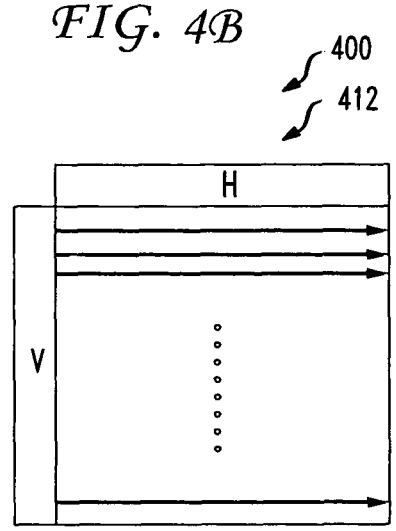
Figure 4C:
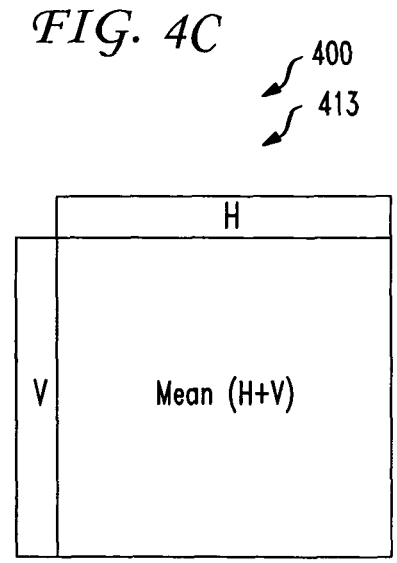
Figure 4D:
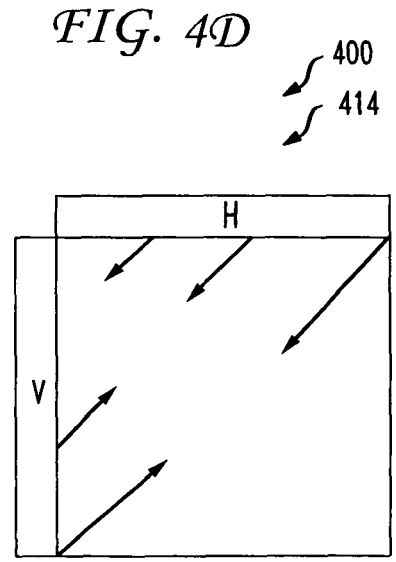
Figure 5:
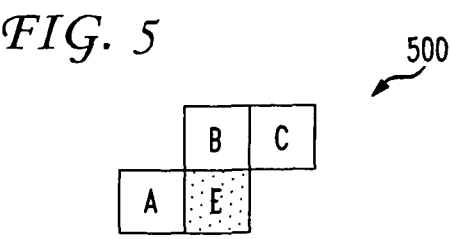
FIG. 5 is a diagram showing exemplary block partitions to which the present principles may be applied.

The present principles are directed to methods and apparatus for implicit and semi-implicit intra mode signaling for video encoders and decoders.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of present principles.

Moreover, as used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Further, as used herein, "neighboring blocks" refers to blocks that are proximate to a current block in a particular picture.

Also, as used herein, "neighboring template" refers to a region in a picture that is formed from, or that corresponds to, one or more neighboring pixels. Stated another way, "neighboring template" refers to e.g., an arrangement and/or selection of neighboring pixels, from which information (e.g., neighboring template data) for the current block may be derived.

Additionally, as used herein, "neighboring template data" refers to data that is derived and/or otherwise obtained based on the neighboring template. For example, such data may be data relating to the one or more neighboring pixels that form a neighboring template. As a further example, such data may include, but is not limited to, intra mode information relating to one or more neighboring pixels that form a neighboring template.

Figure 6:
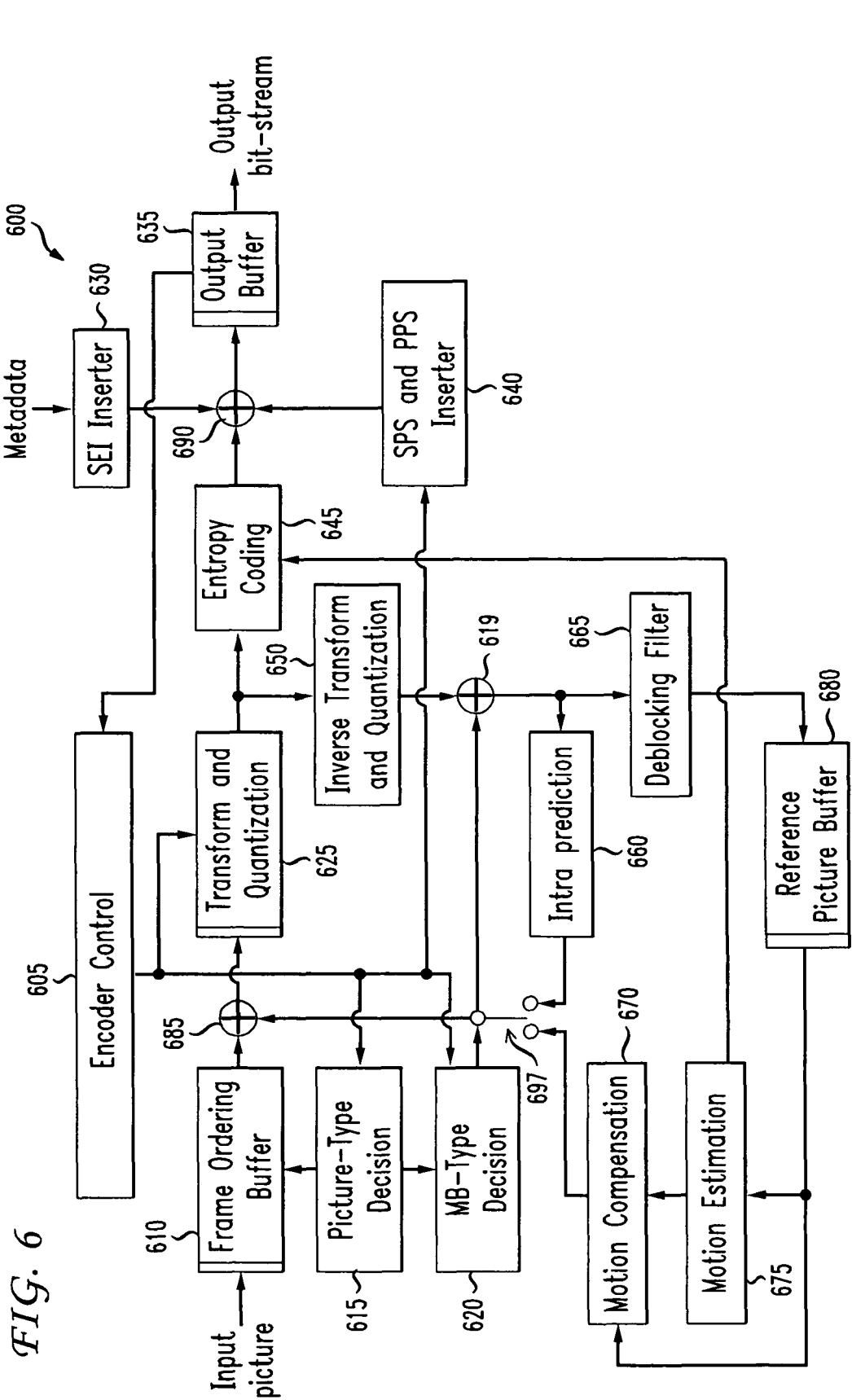
FIG. 6 is a block diagram showing an exemplary video encoder to which the present principles may be applied, in accordance with an embodiment of the present principles.

Turning to FIG. 6, an exemplary video encoder to which the present principles may be applied is indicated generally by the reference numeral 600.

The video encoder 600 includes a frame ordering buffer 610 having an output in signal communication with a non-inverting input of a combiner 685. An output of the combiner 685 is connected in signal communication with a first input of a transformer and quantizer 625. An output of the transformer and quantizer 625 is connected in signal communication with a first input of an entropy coder 645 and a first input of an inverse transformer and inverse quantizer 650. An output of the entropy coder 645 is connected in signal communication with a first non-inverting input of a combiner 690. An output of the combiner 690 is connected in signal communication with a first input of an output buffer 635.

A first output of an encoder controller 605 is connected in signal communication with a second input of the frame ordering buffer 610, a second input of the inverse transformer and inverse quantizer 650, an input of a picture-type decision module 615, a first input of a macroblock-type (MB-type) decision module 620, a second input of an intra prediction module 660, a second input of a deblocking filter 665, a first input of a motion compensator 670, a first input of a motion estimator 675, and a second input of a reference picture buffer 680.

A second output of the encoder controller 605 is connected in signal communication with a first input of a Supplemental Enhancement Information (SEI) inserter 630, a second input of the transformer and quantizer 625, a second input of the entropy coder 645, a second input of the output buffer 635, and an input of the Sequence Parameter Set (SPS) and Picture Parameter Set (PPS) inserter 640.

An output of the SEI inserter 630 is connected in signal communication with a second non-inverting input of the combiner 690.

A first output of the picture-type decision module 615 is connected in signal communication with a third input of the frame ordering buffer 610. A second output of the picture-type decision module 615 is connected in signal communication with a second input of a macroblock-type decision module 620.

An output of the Sequence Parameter Set (SPS) and Picture Parameter Set (PPS) inserter 640 is connected in signal communication with a third non-inverting input of the combiner 690.

An output of the inverse quantizer and inverse transformer 650 is connected in signal communication with a first non-inverting input of a combiner 619. An output of the combiner 619 is connected in signal communication with a first input of the intra prediction module 660 and a first input of the deblocking filter 665. An output of the deblocking filter 665 is connected in signal communication with a first input of a reference picture buffer 680. An output of the reference picture buffer 680 is connected in signal communication with a second input of the motion estimator 675 and a third input of the motion compensator 670. A first output of the motion estimator 675 is connected in signal communication with a second input of the motion compensator 670. A second output of the motion estimator 675 is connected in signal communication with a third input of the entropy coder 645.

An output of the motion compensator 670 is connected in signal communication with a first input of a switch 697. An output of the intra prediction module 660 is connected in signal communication with a second input of the switch 697. An output of the macroblock-type decision module 620 is connected in signal communication with a third input of the switch 697. The third input of the switch 697 determines whether or not the "data" input of the switch (as compared to the control input, i.e., the third input) is to be provided by the motion compensator 670 or the intra prediction module 660. The output of the switch 697 is connected in signal communication with a second non-inverting input of the combiner 619 and an inverting input of the combiner 685.

A first input of the frame ordering buffer 610 and an input of the encoder controller 605 are available as inputs of the encoder 600, for receiving an input picture. Moreover, a second input of the Supplemental Enhancement Information (SEI) inserter 630 is available as an input of the encoder 600, for receiving metadata. An output of the output buffer 635 is available as an output of the encoder 500, for outputting a bitstream.

Figure 7:
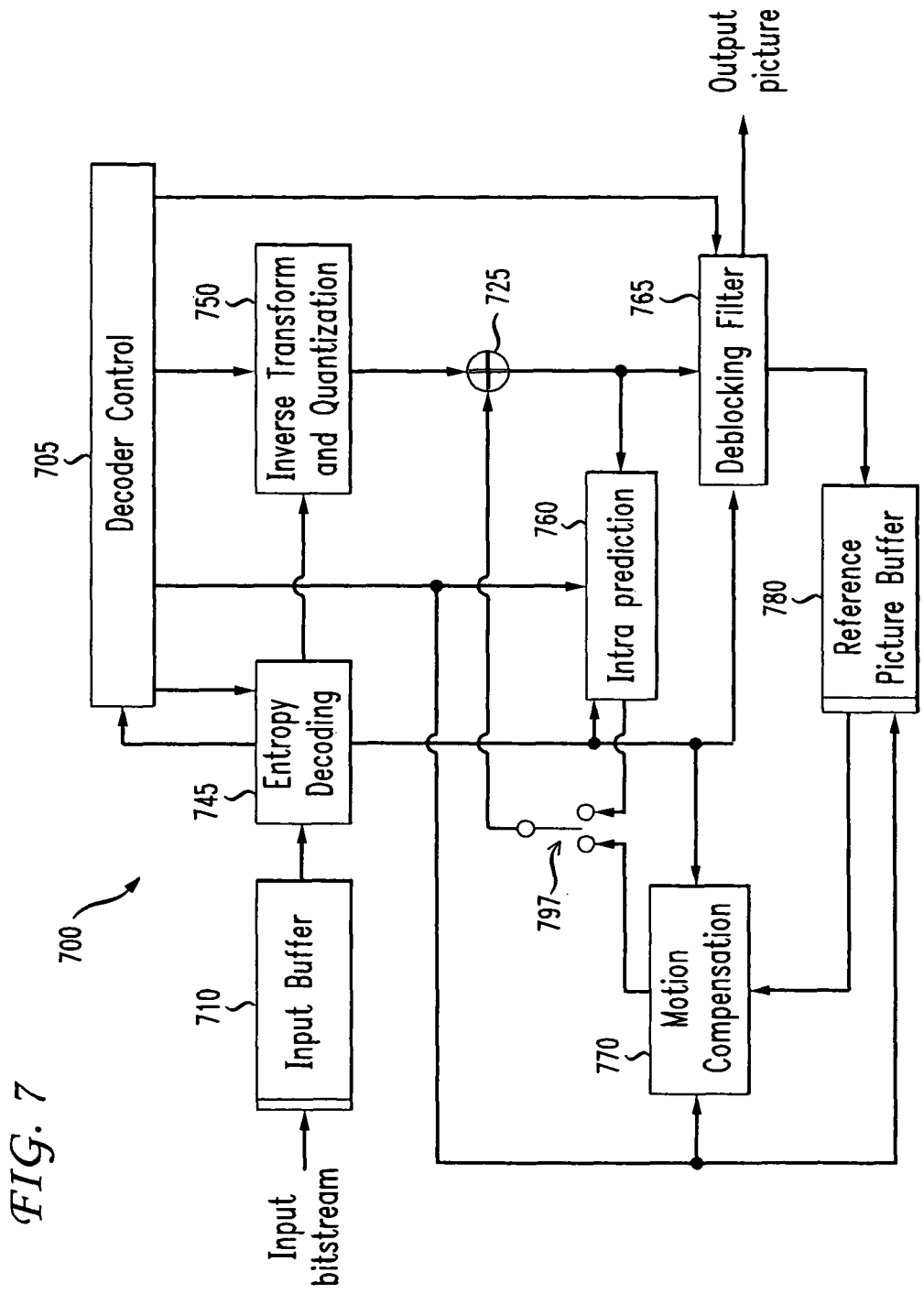
FIG. 7 is a block diagram showing an exemplary video decoder to which the present principles may be applied, in accordance with an embodiment of the present principles.

Turning to FIG. 7, an exemplary video decoder to which the present principles may be applied is indicated generally by the reference numeral 700.

The video decoder 700 includes an input buffer 710 having an output connected in signal communication with a first input of the entropy decoder 745. A first output of the entropy decoder 745 is connected in signal communication with a first input of an inverse transformer and inverse quantizer 750. An output of the inverse transformer and inverse quantizer 750 is connected in signal communication with a second non-inverting input of a combiner 725. An output of the combiner 725 is connected in signal communication with a second input of a deblocking filter 765 and a first input of an intra prediction module 760. A second output of the deblocking filter 765 is connected in signal communication with a first input of a reference picture buffer 780. An output of the reference picture buffer 780 is connected in signal communication with a second input of a motion compensator 770.

A second output of the entropy decoder 745 is connected in signal communication with a third input of the motion compensator 770 and a first input of the deblocking filter 765. A third output of the entropy decoder 745 is connected in signal communication with an input of a decoder controller 705. A first output of the decoder controller 705 is connected in signal communication with a second input of the entropy decoder 745. A second output of the decoder controller 705 is connected in signal communication with a second input of the inverse transformer and inverse quantizer 750. A third output of the decoder controller 705 is connected in signal communication with a third input of the deblocking filter 765. A fourth output of the decoder controller 705 is connected in signal communication with a second input of the intra prediction module 760, a first input of the motion compensator 670, and a second input of the reference picture buffer 780.

An output of the motion compensator 770 is connected in signal communication with a first input of a switch 797. An output of the intra prediction module 760 is connected in signal communication with a second input of the switch 797. An output of the switch 797 is connected in signal communication with a first non-inverting input of the combiner 725.

An input of the input buffer 710 is available as an input of the decoder 700, for receiving an input bitstream. A first output of the deblocking filter 765 is available as an output of the decoder 700, for outputting an output picture.

As noted above, the present principles are directed to methods and apparatus for implicit and semi-implicit intra mode signaling for video encoders and decoders. In an embodiment, the present principles are based on template matching.

Advantageously, the implicit intra mode derivation saves the transmission of bits to indicate the selected intra mode. In addition, we also describe a combination of explicit derivation with the implicit one. We call this mode a semi-implicit mode.

Furthermore, as previously described, although the most probable mode as used by the prior art is simple to compute and reduces the number of bits required for coding the prediction modes, it is not optimal in catching the local variations of block characteristics. Thus, in accordance with the present principles, we take into account the local variations of block characteristics to provide an improved prediction of the most probable mode and, thus, reduce the required number of bits to signal the selected intra mode.

The method used to a signal an intra prediction mode is fundamental to the efficiency of current video encoders for intra coding. The prior art does not fully take advantage of neighboring data to determine the best prediction and prediction mode. In accordance with the present principles, we propose new ways to derive the intra modes. In various embodiments, we described various methods for implicit and semi-implicit signaling, as well as combinations thereof. The implicit signaling avoids the requirement of sending bits to convey what prediction mode should be used. The semi-implicit derivation aids in obtaining a better prediction (for example, with respect to rate-distortion) of the intra mode to use. Also, the combination of implicit and explicit signaling combines the benefits of the previous approaches.

Thus, in accordance with the preset principles, we propose the use of implicit and semi-implicit intra mode signaling. In an embodiment, the proposed scheme predicts the intra mode based on a template composed of neighboring samples. Given the mode of a region or block of a frame to be predicted, we test the neighboring template of the current block which is already decoded. The best mode for the neighboring patch will be predicted as the intra mode for the current block. We describe embodiments with an implicit signaling of the intra mode, as well as a semi-implicit derivation of the mode, and a combination of implicit and explicit modes. Although the background of the present principles is described in the context of the MPEG-4 AVC Standard, and the present principles are compared to the MPEG-4 AVC Standard in terms of benefits and advantages, the present principles apply in general to video encoding and decoding, and are not limited to (and, in fact, is non-compliant with) prior developed standards and recommendations.

In an embodiment, the encoder can choose whether to send the mode prediction error, for example, using implicit or semi-implicit mode signaling. Since the neighborhood of the current pixel(s) are known at the encoder and the decoder side, no additional side information has to be transmitted, and identical prediction is achieved on both (encoder and decoder) sides.

Figure 8:
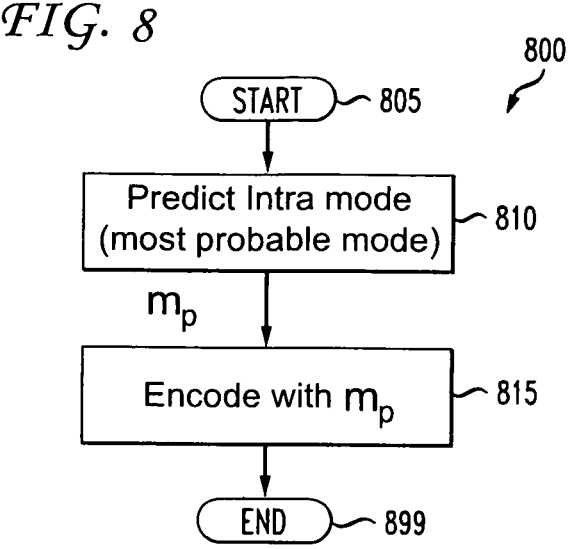
FIG. 8 is a flow diagram showing an exemplary method for implicit intra mode signaling in a video encoder, in accordance with an embodiment of the present principles.

Turning to FIG. 8, an exemplary method for implicit intra mode signaling in a video encoder is indicated generally by the reference numeral 800. The method 800 includes a start block 805 that passes control to a function block 810. The function block 810 predicts the intra mode as the most probable mode $m_p$, and passes control to a function block 815. The function block 815 encodes a current block using the most probable mode $m_p$, and passes control to an end block 899.

Figure 9:
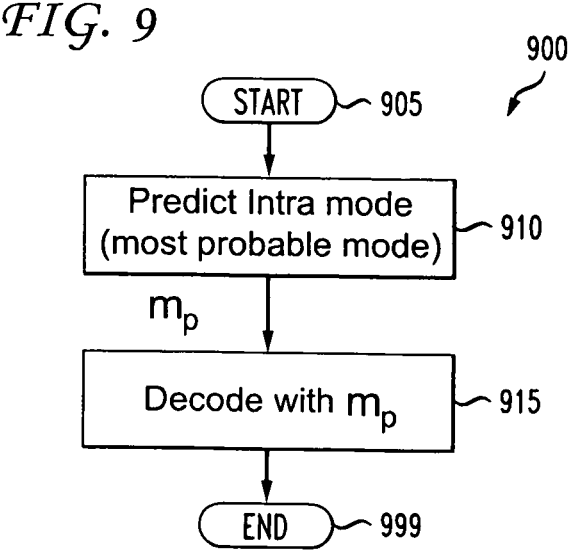
FIG. 9 is a flow diagram showing an exemplary method for implicit intra mode signaling in a video decoder, in accordance with an embodiment of the present principles.

Turning to FIG. 9, an exemplary method for implicit intra mode signaling in a video decoder is indicated generally by the reference numeral 900. The method 900 includes a start block 905 that passes control to a function block 910. The function block 910 predicts the intra mode as the most probable mode $m_p$, and passes control to a function block 915. The function block 915 decodes the current block using the most probable mode $m_p$, and passes control to an end block 999.

Figure 10:
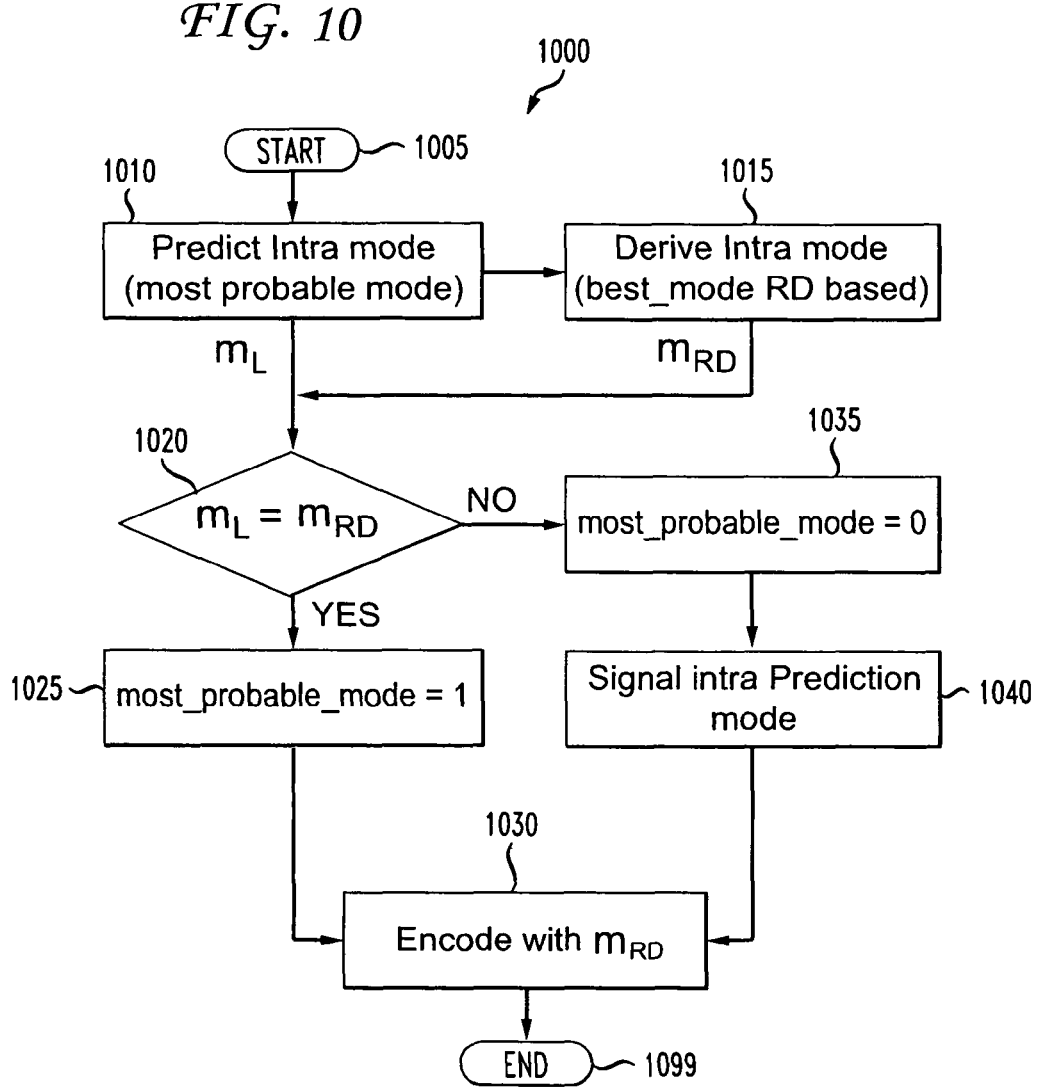
FIG. 10 is a flow diagram showing an exemplary method for semi-implicit intra mode signaling in a video encoder, in accordance with an embodiment of the present principles.

Turning to FIG. 10, an exemplary method for semi-implicit intra mode signaling in a video encoder is indicated generally by the reference numeral 1000. The method 1000 includes a start block 1005 that passes control to a function block 1010. The function block 1010 predicts the intra mode as the most probable mode $m_L$, and passes control to a function block 1015 and a decision block 1020. The function block 1015 derives the intra mode as the best rate-distortion based mode $m_{RD}$ (also referred to herein as "best_mode RD based"), and passes control to the decision block 1020. The decision block 1020 determines whether or not $m_L=m_{RD}$. If so, then control is passed to a function block 1025. Otherwise, control is passed to a function block 1035.

The function block 1025 sets the most_probable_mode=1, and passes control to a function block 1030. The function block 1030 encodes the current block using $m_{RD}$, and passes control to an end block 1099.

The function block 1035 sets the most_probable_mode=0, and passes control to a function block 1040. The function block 1040 signals intra prediction mode, and passes control to the function block 1030.

Figure 11:
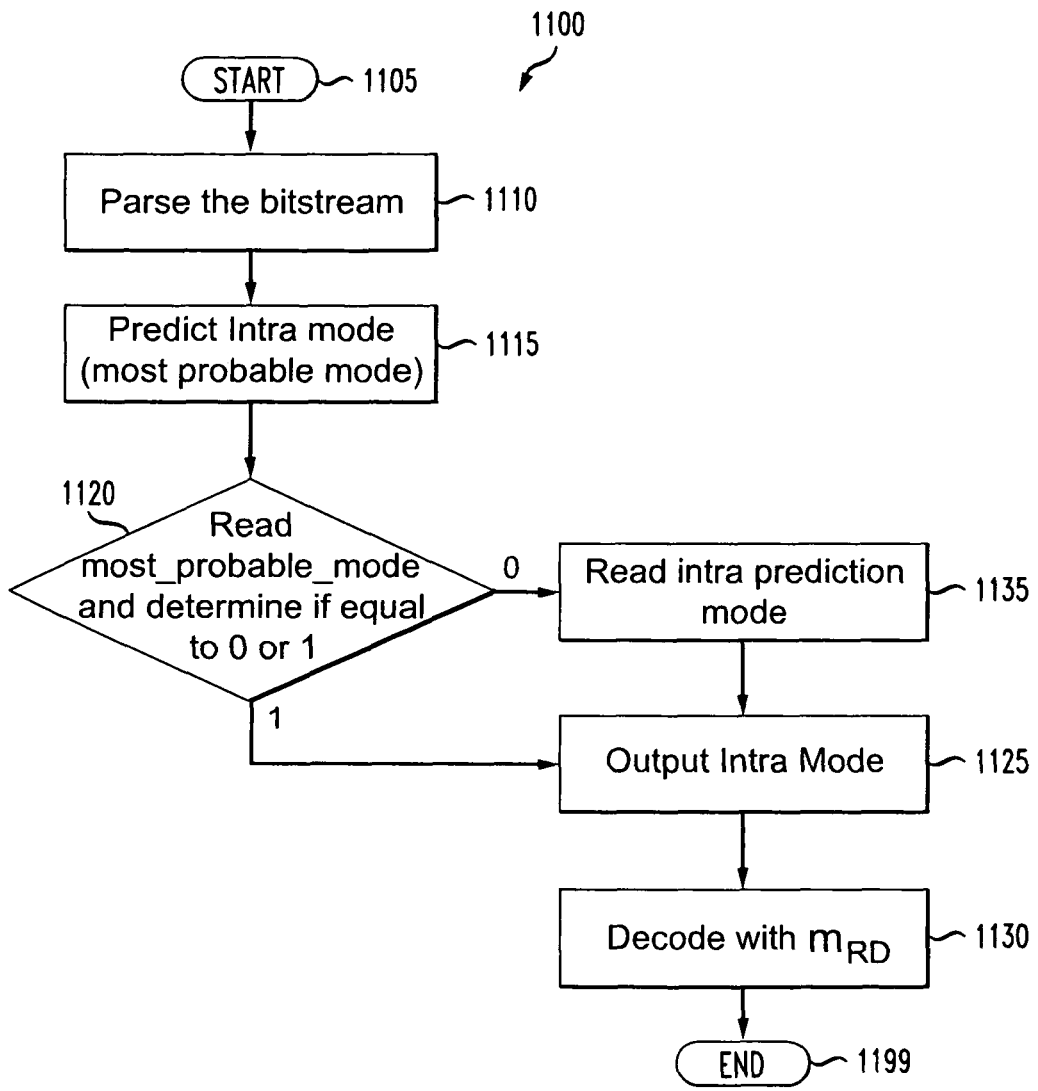
FIG. 11 is a flow diagram showing an exemplary method for semi-implicit intra mode signaling in a video decoder, in accordance with an embodiment of the present principles.

Turning to FIG. 11, an exemplary method for semi-implicit intra mode signaling in a video decoder is indicated generally by the reference numeral 1100. The method 1100 includes a start block 1105 that passes control to a function block 1110. The function block 1110 parses the bitstream, and passes control to a function block 1115. The function block 1115 predicts the intra mode for the current block as the most probable mode, and passes control to a decision block 1120. The decision block 1120 reads most_probable_mode and determines whether most_probable_mode is set to 1 or 0. If the most_probable_mode is set to 1, then control is passed to a function block 1125. Otherwise, control is passed to a function block 1135.

The function block 1125 outputs the intra mode, and passes control to a function block 1130. The function block 1130 decodes the current block using $M_{RD}$, and passes control to an end block 1199.

The function block 1135 reads the intra prediction mode, and passes control to the function block 1125.

Figure 12:
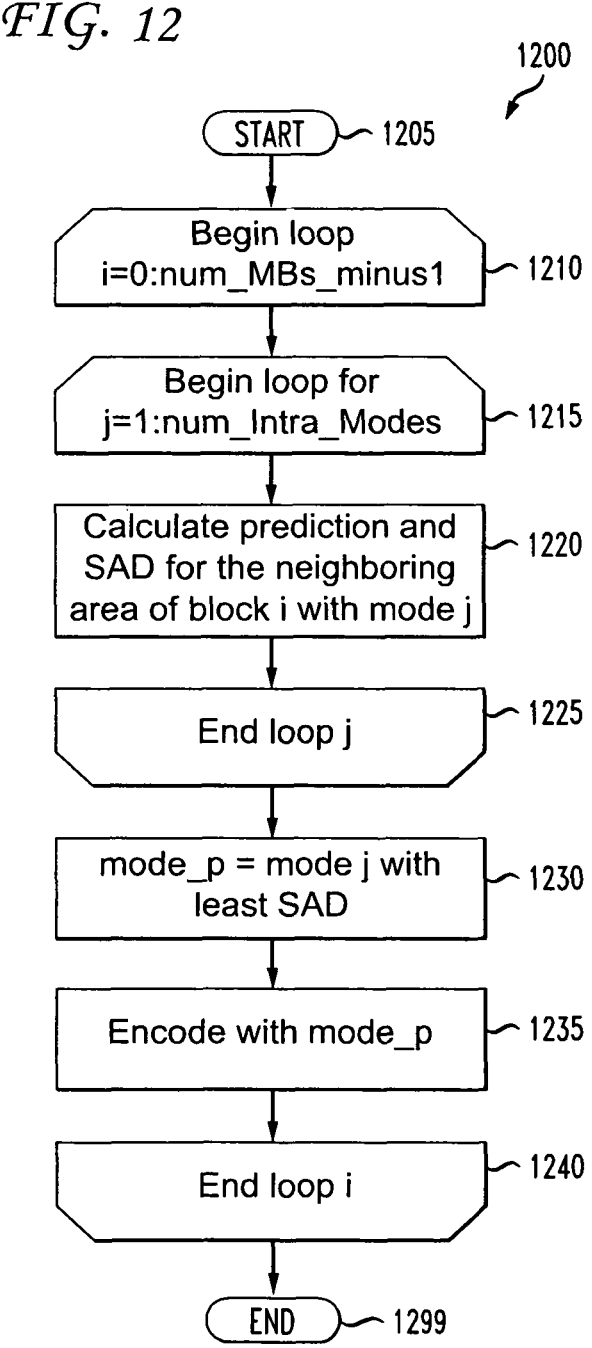
FIG. 12 is a flow diagram showing an exemplary method for implicit intra mode signaling in a video encoder capable of supporting the MPEG-4 AVC Standard, in accordance with an embodiment of the present principles.
Figure 13:
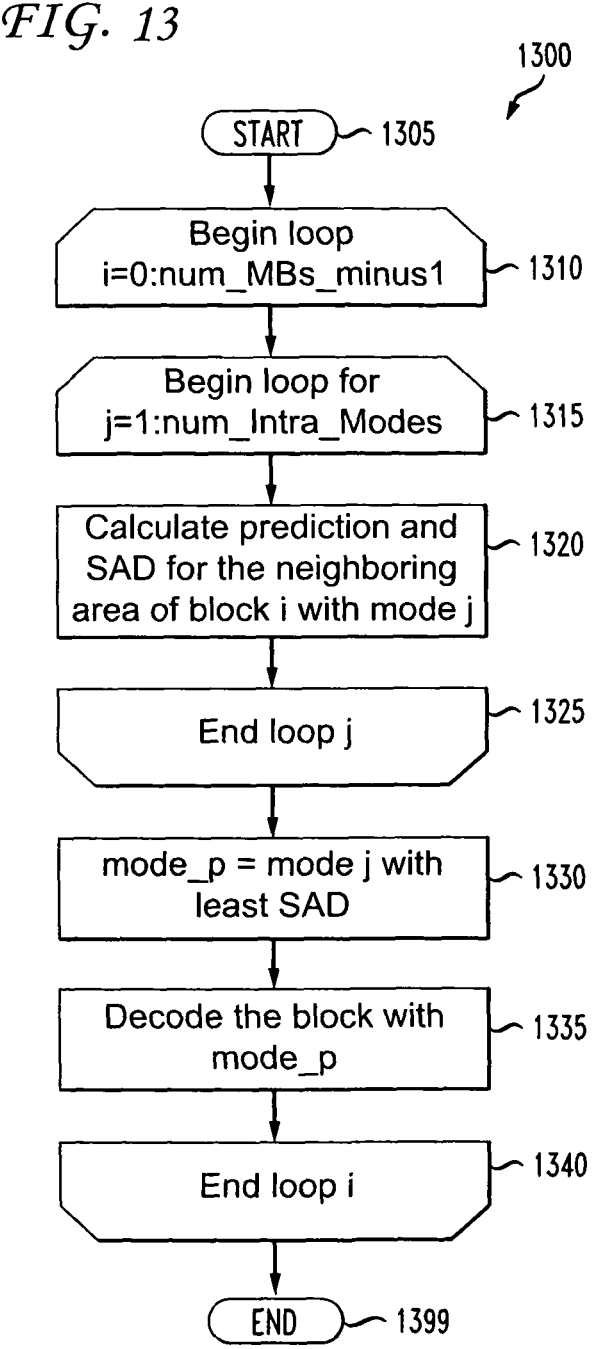
FIG. 13 is a flow diagram showing an exemplary method for implicit intra mode signaling in a video decoder capable of supporting the MPEG-4 AVC Standard, in accordance with an embodiment of the present principles.

In a first illustrative embodiment relating to FIGS. 12 and 13 shown below, to decide the intra mode of the current block, we first search for the best intra mode of its neighboring patch. The encoder calculates the prediction for its neighboring patch with every one of the nine modes for Intra_4×4 and Intra_8×8, or four modes for Intra_16×16. Then, the encoder selects the mode that minimizes the difference (SAD, MSE, and/or so forth) between the prediction and the decoded neighboring patch. This mode mode_p will be used to encode the current block. The same operation can be performed at the decoder and the identical prediction mode is generated.

Turning to FIG. 12, an exemplary method for implicit intra mode signaling in a video encoder capable of supporting the MPEG-4 AVC Standard is indicated generally by the reference numeral 1200. The method 1200 includes a start block 1205 that passes control to a loop limit block 1210. The loop limit block 1210 begins a loop i over each macroblock of a current picture (field or frame) or portion of a picture, from 0 to num_MBs_minus1, and passes control to a loop limit block 1215. The loop limit block 1215 begins a loop j over each intra mode, from 1 to num_Intra_Modes, and passes control to a function block 1220. The function block 1220 calculates a prediction and a sum of absolute difference (SAD) for the neighboring area of block i with mode j, and passes control to a loop limit block 1225. The loop limit block 1225 ends the loop j, and passes control to a function block 1230. The function block 1230 sets mode_p=mode j with the least SAD, and passes control to a function block 1235. The function block 1235 encodes a current block using mode_p, and passes control to a loop limit block 1240. The loop limit block 1240 ends the loop i, and passes control to an end block 1299.

Turning to FIG. 13, an exemplary method for implicit intra mode signaling in a video decoder capable of supporting the MPEG-4 AVC Standard is indicated generally by the reference numeral 1300. The method 1300 includes a start block 1305 that passes control to a loop limit block 1310. The loop limit block 1310 begins a loop i over each macroblock of a current picture (field or frame) or portion of a picture, from 0 to num_MBs_minus1, and passes control to a loop limit block 1315. The loop limit block 1315 begins a loop j over each intra mode, from 1 to num_Intra_Modes, and passes control to a function block 1320. The function block 1320 calculates a prediction and a sum of absolute difference (SAD) for the neighboring area of block i with mode j, and passes control to a loop limit block 1325. The loop limit block 1325 ends the loop j, and passes control to a function block 1330. The function block 1330 sets mode_p=mode j with the least SAD, and passes control to a function block 1335. The function block 1335 decodes a current block using mode_p, and passes control to a loop limit block 1340. The loop limit block 1340 ends the loop i, and passes control to an end block 1399.

Figure 14:
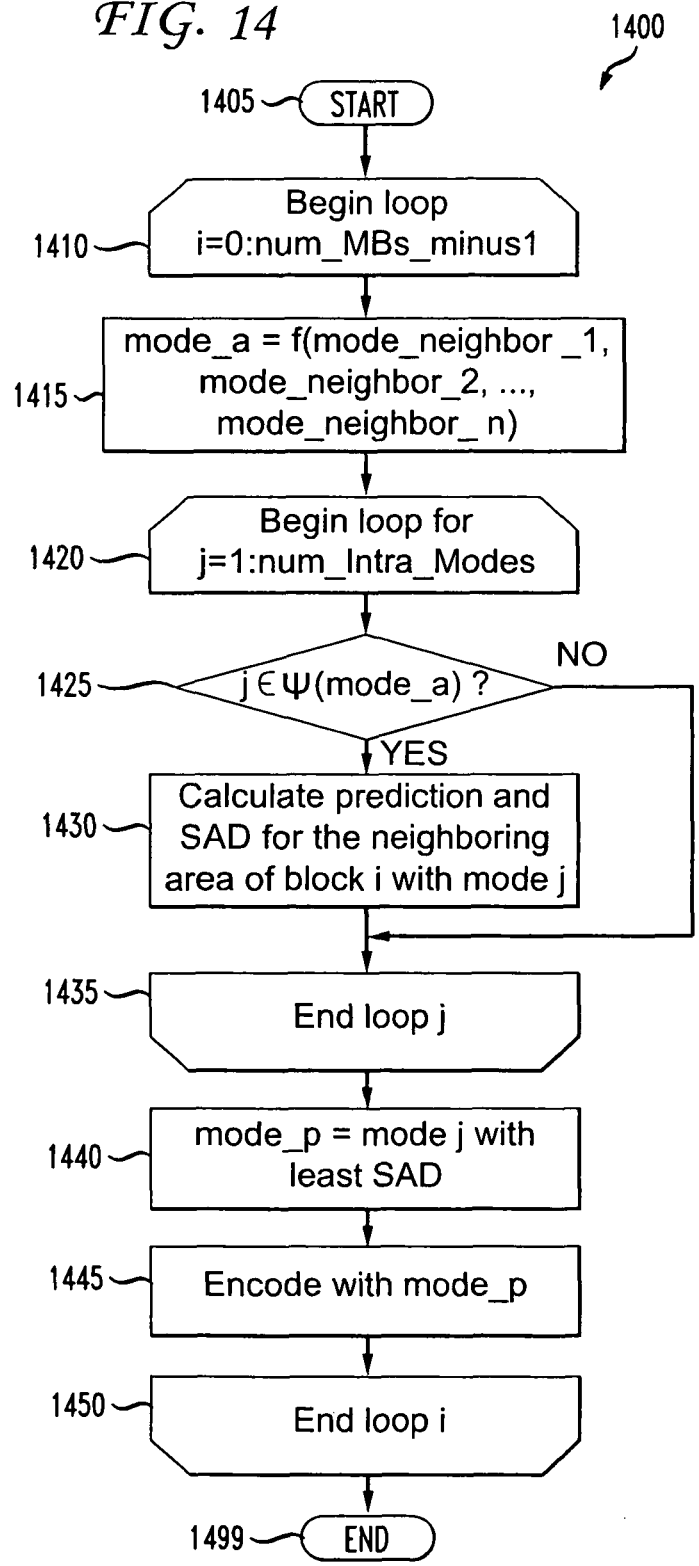
FIG. 14 is a flow diagram showing an exemplary method for implicit intra mode signaling in a video encoder, in accordance with an embodiment of the present principles.
Figure 15:
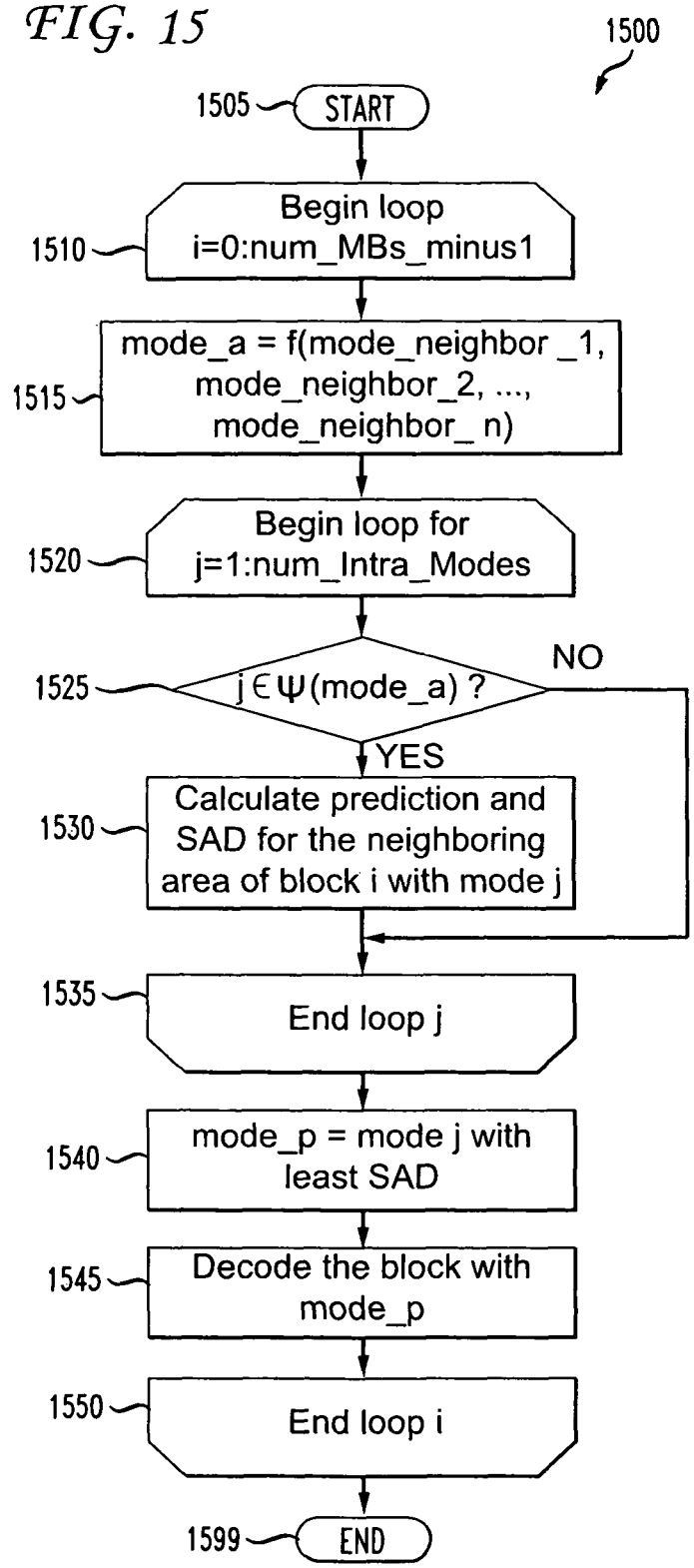
FIG. 15 is a flow diagram showing an exemplary method for implicit intra mode signaling in a video decoder, in accordance with an embodiment of the present principles.

In a second illustrative embodiment relating to FIGS. 14 and 15 shown below, we consider the MPEG-4 AVC Standard most probable mode and reduce the computational complexity by only searching within a limited range. FIGS. 14 and 15 illustrate how the implicit intra mode signaling is respectively included in a video encoder and decoder. Before encoding the current block, we set the most probable mode as follows:

mode_a=f(mode_neighbor_1, mode_neighbor_2, . . . , mode_neighbor_n), where mode_neighbor_i is the intra mode of a respective neighboring block and f(.) is a function of the neighboring blocks modes. To decide the intra mode of the current block, we test its neighboring patch only with the set of modes that are correlated with mode_a. In other words, predictions and SADs are calculated for each mode in the set M=ψ(mode_a) before the best mode mode_p is selected from M. ψ is a function that inputs a mode and outputs a range of modes. The mode mode_p will be used to assist the encoding of the current block. The same operation can be performed at the decoder and identical prediction mode is generated.

Turning to FIG. 14, an exemplary method for implicit intra mode signaling in a video encoder is indicated generally by the reference numeral 1400. The method 1400 includes a start block 1405 that passes control to a loop limit block 1410. The loop limit block 1410 begins a loop i over each macroblock of a current picture (field or frame) or portion of a picture, from 0 to num_MBs_minus1, and passes control to a function block 1415. The function block 1415 sets mode_a = f(mode_neighbor_1, mode_neighbor_2, . . . mode_neighbor_n), and passes control to a loop limit block 1420. The loop limit block 1420 begins a loop j over each intra mode, from 1 to num_Intra_Modes, and passes control to a decision block 1425. The decision block 1425 determines whether or not j∈ϕ(mode_a). If so, then control is passed to a function block 1430. Otherwise, control is passed to a loop limit block 1435.

The function block 1430 calculates a prediction and a sum of absolute difference (SAD) for the neighboring area of block i with mode j, and passes control to the loop limit block 1435.

The loop limit block 1435 ends the loop j, and passes control to a function block 1440. The function block 1440 sets mode_p=mode j with the least SAD, and passes control to a function block 1445. The function block 1445 encodes a current block using mode_p, and passes control to a loop limit block 1450. The loop limit block 1450 ends the loop i, and passes control to an end block 1499.

Turning to FIG. 15, an exemplary method for implicit intra mode signaling in a video decoder is indicated generally by the reference numeral 1500. The method 1500 includes a start block 1505 that passes control to a loop limit block 1510. The loop limit block 1510 begins a loop i over each macroblock of a current picture (field or frame) or portion of a picture, from 0 to num_MBs_minus1, and passes control to a function block 1515. The function block 1515 sets mode_a=f(mode_neighbor_1, mode_neighbor_2, . . . mode_neighbor_n), and passes control to a loop limit block 1520. The loop limit block 1520 begins a loop j over each intra mode, from 1 to num_Intra_Modes, and passes control to a decision block 1525. The decision block 1525 determines whether or not j∈φ (mode_a). If so, then control is passed to a function block 1530. Otherwise, control is passed to a loop limit block 1535.

The function block 1530 calculates a prediction and a sum of absolute difference (SAD) for the neighboring area of block i with mode j, and passes control to the loop limit block 1535.

The loop limit block 1535 ends the loop j, and passes control to a function block 1540. The function block 1540 sets mode_p=mode j with the least SAD, and passes control to a function block 1545. The function block 1545 decodes a current block using mode_p, and passes control to a loop limit block 1550. The loop limit block 1550 ends the loop i, and passes control to an end block 1599.

Figure 16:
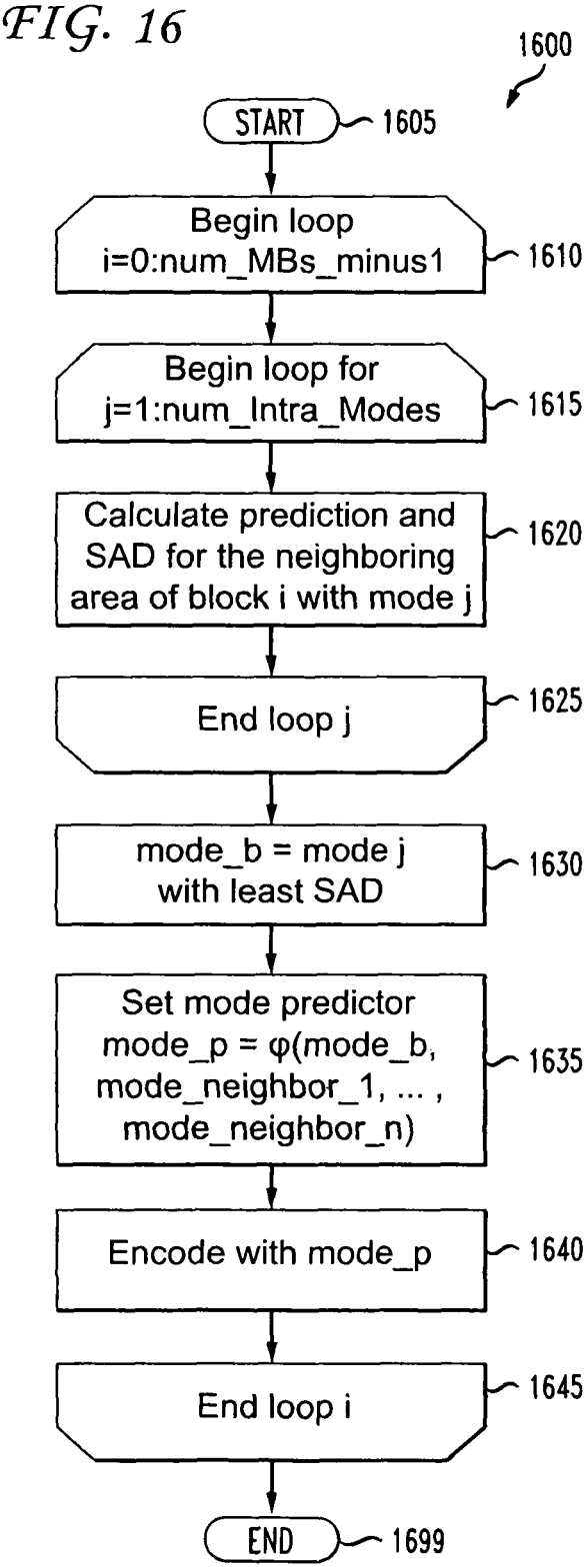
FIG. 16 is a flow diagram showing an exemplary method for implicit intra mode signaling in a video encoder, in accordance with an embodiment of the present principles.
Figure 17:
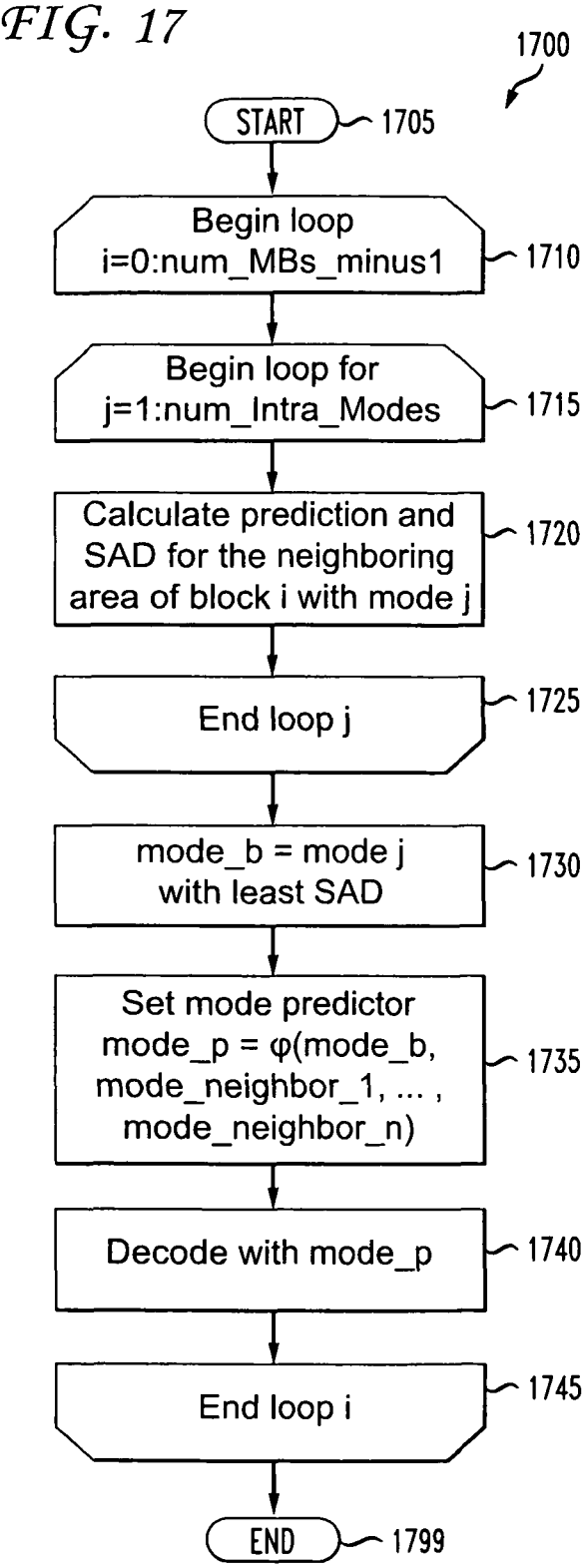
FIG. 17 is a flow diagram showing an exemplary method for implicit intra mode signaling in a video decoder, in accordance with an embodiment of the present principles.

In a third illustrative embodiment relating to FIGS. 16 and 17 shown below, we use the MPEG-4 AVC Standard most probable mode to reduce intra prediction residues and improve the coding efficiency. FIGS. 16 and 17 illustrate how the implicit intra mode signaling is respectively included in a video encoder and decoder. After the encoder selects the best intra mode mode_b for the neighboring patch, we predict the intra mode of the current block as mode_p=φ(mode_b, mode_neighbor_1, mode_neighbor_2, . . . mode_neighbor_n). This mode will be used to encode the current block. The same operation can be performed at the decoder and identical prediction mode is generated.

Turning to FIG. 16, an exemplary method for implicit intra mode signaling in a video encoder is indicated generally by the reference numeral 1600. The method 1600 includes a start block 1605 that passes control to a loop limit block 1610. The loop limit block 1610 begins a loop i over each macroblock of a current picture (field or frame) or portion of a picture, from 0 to num_MBs_minus1, and passes control to a loop limit block 1615. The loop limit block 1615 begins a loop j over each intra mode, from 1 to num_Intra_Modes, and passes control to a function block 1620. The function block 1620 calculates a prediction and a sum of absolute difference (SAD) for the neighboring area of block i with mode j, and passes control to a loop limit block 1625. The loop limit block 1625 ends the loop j, and passes control to a function block 1630. The function block 1630 sets mode_b=mode j with least SAD, and passes control to a function block 1635. The function block 1635 sets mode predictor mode_p=φ (mode_b_, mode_neighboring_1, . . . mode_neighbor_n), and passes control to a function block 1640. The function block 1640 encodes the current block using mode_p, and passes control to a loop limit block 1645. The loop limit block 1645 ends the loop i, and passes control to an end block 1699.

Turning to FIG. 17, an exemplary method for implicit intra mode signaling in a video decoder is indicated generally by the reference numeral 1700. The method 1700 includes a start block 1705 that passes control to a loop limit block 1710. The loop limit block 1710 begins a loop i over each macroblock of a current picture (field or frame) or portion of a picture, from 0 to num_MBs_minus1, and passes control to a loop limit block 1715. The loop limit block 1715 begins a loop j over each intra mode, from 1 to num_Intra_Modes, and passes control to a function block 1720. The function block 1720 calculates a prediction and a sum of absolute difference (SAD) for the neighboring area of block i with mode j, and passes control to a loop limit block 1725. The loop limit block 1725 ends the loop j, and passes control to a function block 1730. The function block 1730 sets mode_b=mode j with least SAD, and passes control to a function block 1735. The function block 1735 sets mode predictor mode_p=φ (mode_b_, mode_neighboring_1, . . . mode_neighbor_n), and passes control to a function block 1740. The function block 1740 decodes the current block using mode_p, and passes control to a loop limit block 1745. The loop limit block 1745 ends the loop i, and passes control to an end block 1799.

Figure 18:
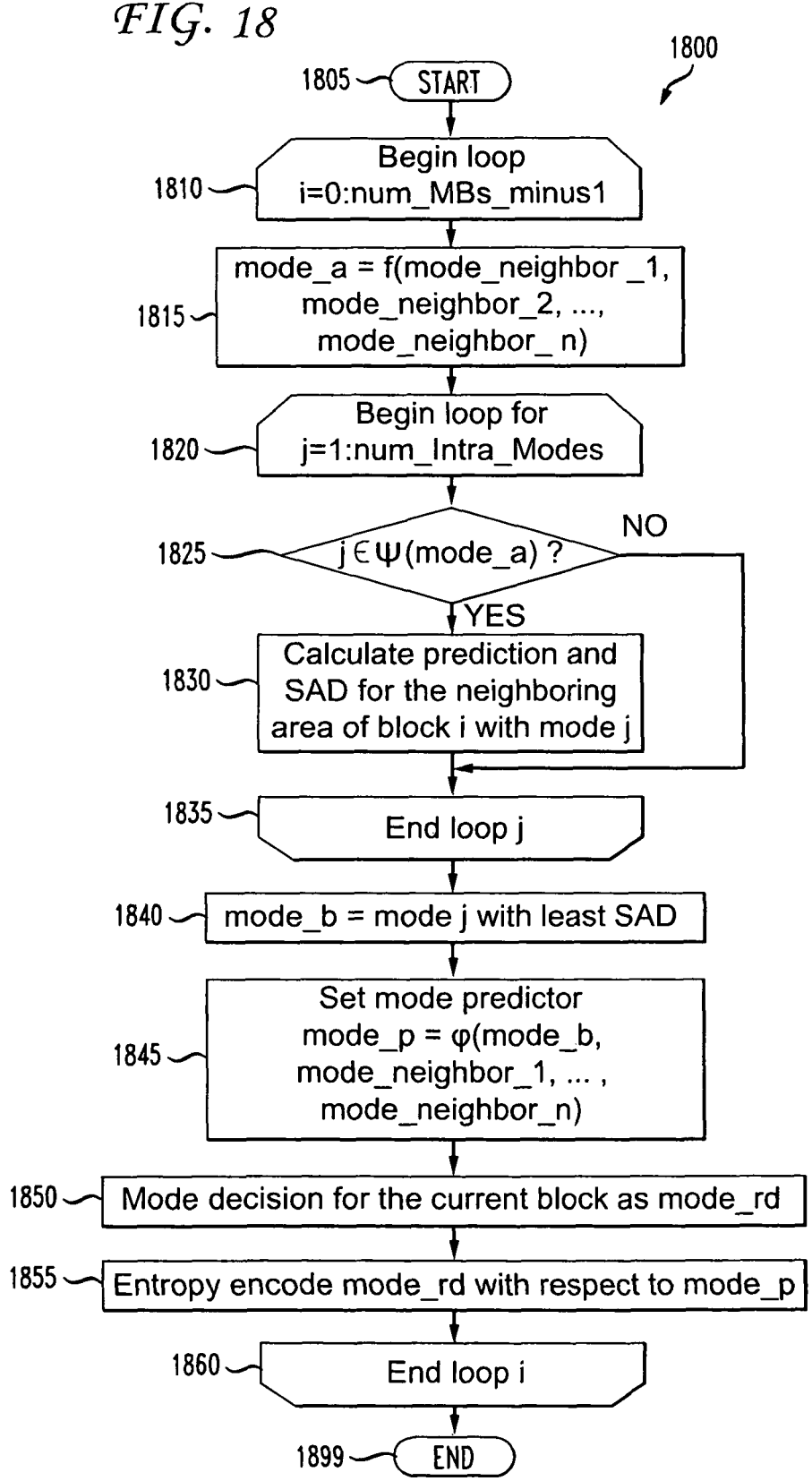
FIG. 18 is a flow diagram showing an exemplary method for semi-implicit intra mode signaling in a video encoder, in accordance with an embodiment of the present principles.
Figure 19:
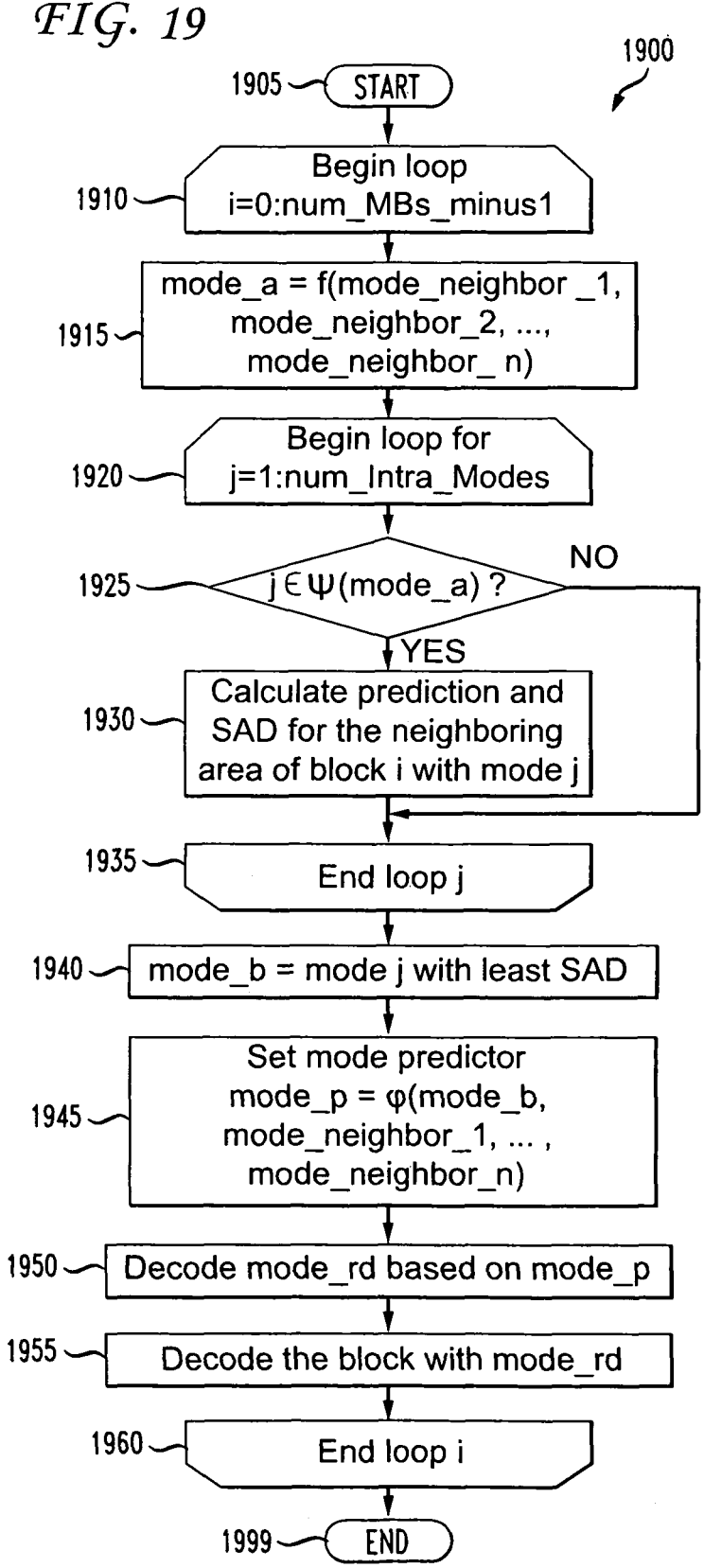
FIG. 19 is a flow diagram showing an exemplary method for semi-implicit intra mode signaling in a video decoder, in accordance with an embodiment of the present principles.

In a fourth illustrative embodiment relating to FIGS. 18 and 19 shown below, the encoder can send the mode prediction error to the decoder. FIGS. 18 and 19 illustrate how the semi-implicit intra mode signaling is respectively included in a video encoder and decoder. Before encoding the current block, we set the most probable mode as mode_a= f (mode_neighbor_1, mode_neighbor_2, . . . , mode_neighbor_n), where mode_neighbor_i is the intra mode of a neighboring block and f(.) is a function of the neighboring blocks modes. As a particular embodiment, we can set mode_a=min (mode_up, mode_left), similarly as the MPEG-4 AVC Standard most probable mode. To decide the intra mode of the current block, we test its neighboring patch only with the set of modes that are correlated with mode_a. Predictions and SADs are calculated for each mode in the set M=ψ(mode_a) before the best mode mode_b is selected from M. In particular, if we order the intra modes as in the MPEG-4 AVC Standard, we can set ψ(mode_a) to the region [max{0, mode_a−2}, min{mode_a+1, mode_max}] where mode_max is the maximum mode index. Then, the intra mode of the current block is predicted as mode_p=φ(mode_b, mode_neighbor_1, mode_neighbor_2, . . . mode_neighbor_n). One possible embodiment of this function φ is mode_p=median{mode_b, mode_up, mode_left}. After that, rate-distortion (RD) optimized mode decision is performed for the current block. The best mode mode_rd is the one that provides the minimum RD cost, which takes into consideration the rate required for coding a mode with respect to mode_p. Finally, the difference between mode_rd and mode_p is signaled to the decoder as in the MPEG-4 AVC Standard, and the same operation can be performed at the decoder to generate identical prediction.

Turning to FIG. 18, an exemplary method for semi-implicit intra mode signaling in a video encoder is indicated generally by the reference numeral 1800. The method 1800 includes a start block 1805 that passes control to a loop limit block 1810. The loop limit block 1810 begins a loop, i over each macroblock of a current picture (field or frame) or portion of a picture, from 0 to num_MBs_minus1, and passes control to a function block 1815. The function block 1815 sets mode_a=f (mode_neighbor_1, mode_neighbor_2, . . . mode_neighbor_n), and passes control to a loop limit block 1820. The loop limit block 1820 begins a loop j over each intra mode, from 1 to num_Intra_Modes, and passes control to a decision block 1825. The decision block 1825 determines whether or not j∈φ(mode_a). If so, then control is passed to a function block 1830. Otherwise, control is passed to a loop limit block 1835.

The function block 1830 calculates a prediction and a sum of absolute difference (SAD) for the neighboring area of block i with mode j, and passes control to the loop limit block 1835.

The loop limit block 1835 ends the loop j, and passes control to .a function block 1840. The function block 1840 sets mode_b=mode j with the least SAD, and passes control to a function block 1845. The function. block 1845 sets mode predictor mode_p=φ(mode_b_, mode_neighboring_1, . . . , mode_neighbor_n), and passes control to a function block 1850. The function block 1850 performs a mode decision for the current block as mode_rd, and passes control to a function block 1855. The function block 1855 entropy encodes mode_rd with respect to mode_p, and passes control to a loop limit block 1860. The loop limit block 1860 ends the loop i, and passes control to an end block 1899.

Turning to FIG. 19, an exemplary method for semi-implicit intra mode signaling in a video decoder is indicated generally by the reference numeral 1900. The method 1900 includes a start block 1905 that passes control to a loop limit block 1910. The loop limit block 1910 begins a loop i over each macroblock of a current picture (field or frame) or portion of a picture, from 0 to num_MBs_minus1, and passes control to a function block 1915. The function block 1915 sets mode_a=f (mode_neighbor_1, mode_neighbor_2, . . . , mode_neighbor_n), and passes control to a loop limit block 1920. The loop limit block 1920 begins a loop j over each intra mode, from 1 to num_Intra_Modes, and passes control to a decision block 1925. The decision block 1925 determines whether or not j∈φ(mode_a). If so, then control is passed to a function block 1930. Otherwise, control is passed to a loop limit block 1935.

The function block 1930 calculates a prediction and a sum of absolute difference (SAD) for the neighboring area of block i with mode j, and passes control to the loop limit block 1935.

The loop limit block 1935 ends the loop j, and passes control to a function block 1940. The function block 1940 sets mode_b=mode j with the least SAD, and passes control to a function block 1945. The function block 1945 sets mode predictor mode_p=φ(mode_b_, mode_neighboring_1, . . . , mode_neighbor_n), and passes control to a function block 1950. The function block 1950 decodes mode_rd based on mode_p, and passes control to a function block 1955. The function block 1955 decodes the current block using mode_rd, and passes control to a loop limit block 1960. The loop limit block 1960 ends the loop i, and passes control to an end block 1999.

In a fifth embodiment, we use the implicit modes for some of the blocks and the explicit modes for the other blocks. This implicit-explicit combination of modes provides the best choice in the rate-distortion (RD) sense for all the explicit blocks, which are satisfactory anchors for the implicit blocks. Meanwhile, side information does not have to be sent for "implicit blocks", as is done for "explicit blocks", however the "implicit blocks" use the "explicit blocks" as a good reference(s) to derive the most probable mode. Using this combination of blocks, the benefits of implicit and explicit signaling can be obtained.

The enabling or disabling of the present principles can be signaled in high level syntax. As noted above, a high level syntax includes, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

A description will now be given of some of the many attendant advantages/features of the present invention, some of which have been mentioned above. For example, one advantage/feature is an apparatus having an encoder for encoding picture data for at least a portion of a picture. The encoder derives an intra mode to apply to the portion from neighboring template data and abstains from explicitly signaling the intra mode for the portion. The neighboring template data corresponds to a neighboring template formed from neighboring pixels with respect to the portion.

Another advantage/feature is the apparatus having the encoder as described above, wherein the intra mode for the portion is implicitly derived using the neighboring template data to test a subset of a set of available intra modes, and a particular intra mode within the subset is selected as the intra mode for the portion based upon a least distortion measure.

Yet another advantage/feature is the apparatus having the encoder wherein the intra mode for the portion is implicitly derived using the neighboring template data to test a subset of a set of available intra modes, and a particular intra mode within the subset is selected as the intra mode for the portion based upon a least distortion measure as described above, wherein the least distortion measure is determined based upon a sum of absolute difference or a mean square error.

Still another advantage/feature is the apparatus having the encoder wherein the intra mode for the portion is implicitly derived using the neighboring template data to test a subset of a set of available intra modes, and a particular intra mode within the subset is selected as the intra mode for the portion based upon a least distortion measure as described above, wherein the subset is determined based upon a function of intra modes used for neighboring blocks.

Moreover, another advantage/feature is the apparatus having the encoder wherein the intra mode for the portion is implicitly derived using the neighboring template data to test a subset of a set of available intra modes, and a particular intra mode within the subset is selected as the intra mode for the portion based upon a least distortion measure as described above, wherein the intra mode for the portion is further implicitly derived as a function of intra modes for the neighboring blocks and a best mode for the neighboring template.

Further, another advantage/feature is the apparatus having the encoder wherein the intra mode for the portion is further implicitly derived as a function of intra modes for the neighboring blocks and a best mode for the neighboring template as described above, wherein the best mode for the neighboring template is determined by testing several or all intra modes used for the neighboring template, and selecting a given intra mode that provides a least distortion measure, from among the several or all intra modes used for the neighboring template, as the best mode for the neighboring template.

Also, another advantage/feature is the apparatus having the encoder wherein the intra mode for the portion is further implicitly derived as a function of intra modes for the neighboring blocks and a best mode for the neighboring template as described above, wherein the function is a median function.

Additionally, another advantage/feature is the apparatus having the encoder as described above, wherein an implicit intra mode derivation is performed for a subset of blocks in a picture, while an explicit intra mode signaling is performed for the other blocks in the picture, the subset of blocks being the portion.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/ output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
    an encoder for encoding picture data for at least a portion of a picture, wherein said encoder derives an intra mode to apply to the portion from neighboring template data and abstains from explicitly signaling the intra mode for the portion, the neighboring template data corresponding to a neighboring template formed from neighboring pixels with respect to the portion, and
    wherein the intra mode for the portion is implicitly derived from a subset of a set of available intra modes, and not an entirety of the set, by
    using the neighboring template data to test a particular intra mode within the subset based upon a least distortion measure from among respective distortion measures,
    said least distortion measure being performed for a particular intra mode between predicted values and said neighboring template data,
    wherein the predicted values and said neighboring template data correspond to a candidate neighborhood with respect to the portion;
    and wherein said neighboring template comprises a neighboring patch with respect to said portion, and
    wherein said neighboring patch includes already decoded pixels.

2. The apparatus of claim 1, wherein the intra mode for the portion is implicitly derived using the neighboring template data to test a subset of a set of available intra modes and not an entirety of the set, and a particular intra mode within the subset is selected as the intra mode for the portion based upon a least distortion measure.

3. The apparatus of claim 2, wherein the least distortion measure is determined based upon a sum of absolute difference or a mean square error.

4. The apparatus of claim 2, wherein the subset is determined based upon a function of intra modes used for neighboring blocks.

5. The apparatus of claim 2, wherein the intra mode for the portion is further implicitly derived as a function of intra modes for the neighboring blocks and a best mode for the neighboring template.

6. The apparatus of claim 5, wherein the best mode for the neighboring template is determined by testing several or all intra modes used for the neighboring template, and selecting a given intra mode providing a least distortion measure, from among the several or all intra modes used for the neighboring template, as the best mode for the neighboring template.

7. The apparatus of claim 5, wherein the function is a median function.

8. The apparatus of claim 1, wherein an implicit intra mode derivation is performed for a subset of blocks in a picture, while an explicit intra mode signaling is performed for the other blocks in the picture, the subset of blocks being the portion.

9. In a video encoder, a method, comprising:
    encoding picture data for at least a portion of a picture by deriving an intra mode to apply to the portion from neighboring template data; and
    abstaining from explicitly signaling the intra mode for the portion,
    wherein the neighboring template data corresponds to a neighboring template formed from neighboring pixels with respect to the portion, and
    wherein the intra mode for the portion is implicitly derived from a subset of a set of available intra modes, and not an entirety of the set, by
    using the neighboring template data to test a particular intra mode within the subset based upon a least distortion measure from among respective distortion measures,
    said least distortion measure being performed for a particular intra mode between predicted values and said neighboring template data,
    wherein the predicted values and said neighboring template data correspond to a candidate neighborhood with respect to the portion;
    and wherein said neighboring template comprises a neighboring patch with respect to said portion, and
    wherein said neighboring patch includes already decoded pixels.

10. The method of claim 9, wherein the intra mode for the portion is implicitly derived using the neighboring template data to test a subset of a set of available intra modes and not an entirety of the set, and a particular intra mode within the subset is selected as the intra mode for the portion based upon a least distortion measure.

11. The method of claim 10, wherein the least distortion measure is determined based upon a sum of absolute difference or a mean square error.

12. The method of claim 10, wherein the subset is determined based upon a function of intra modes used for neighboring blocks.

13. The method of claim 10, wherein the intra mode for the portion is further implicitly derived as a function of intra modes for the neighboring blocks and a best mode for the neighboring template.

14. The method of claim 13, wherein the best mode for the neighboring template is determined by testing several or all intra modes used for the neighboring template, and selecting a given intra mode providing a least distortion measure, from among the several or all intra modes used for the neighboring template, as the best mode for the neighboring template.

15. The method of claim 13, wherein the function is a median function.

16. The method of claim 9, wherein an implicit intra mode derivation is performed for a subset of blocks in a picture, while an explicit intra mode signaling is performed for the other blocks in the picture, the subset of blocks being the portion.

17. An apparatus, comprising:
a decoder for decoding picture data for at least a portion of a picture, wherein said decoder derives an intra mode to apply to the portion from neighboring template data in an absence of receiving any explicit signaling of the intra mode for the portion, the neighboring template data corresponding to a neighboring template formed from neighboring pixels with respect to the portion, and
wherein the intra mode for the portion is implicitly derived from a subset of a set of available intra modes, and not an entirety of the set, by
using the neighboring template data to test a particular intra mode within the subset based upon a least distortion measure from among respective distortion measures,
said least distortion measure being performed for a particular intra mode between predicted values and said neighboring template data,
wherein the predicted values and said neighboring template data correspond to a candidate neighborhood with respect to the portion;
and wherein said neighboring template comprises a neighboring patch with respect to said portion, and
wherein said neighboring patch includes already decoded pixels.

18. The apparatus of claim 17, wherein the intra mode for the portion is implicitly derived using the neighboring template data to test a subset of a set of available intra modes and not an entirety of the set, and a particular intra mode within the subset is selected as the intra mode for the portion based upon a least distortion measure.

19. The apparatus of claim 18, wherein the least distortion measure is determined based upon a sum of absolute difference or a mean square error.

20. The apparatus of claim 18, wherein the subset is determined based upon a function of intra modes used for neighboring blocks.

21. The apparatus of claim 18, wherein the intra mode for the portion is further implicitly derived as a function of intra modes for the neighboring blocks and a best mode for the neighboring template.

22. The apparatus of claim 21, wherein the best mode for the neighboring template is determined by testing several or all intra modes used for the neighboring template, and selecting a given intra mode providing a least distortion measure, from among the several or all intra modes used for the neighboring template, as the best mode for the neighboring template.

23. The apparatus of claim 21, wherein the function is a median function.

24. The apparatus of claim 17, wherein an implicit intra mode derivation is performed for a subset of blocks in a picture, while an explicit intra mode derivation is performed for the other blocks in the picture, the subset of blocks being the portion.

25. In a video decoder, a method, comprising:
decoding picture data for at least a portion of a picture by deriving an intra mode to apply to the portion from neighboring template data in an absence of receiving any explicit signaling of the intra mode for the portion,
wherein the neighboring template data corresponds to a neighboring template formed from neighboring pixels with respect to the portion, and
wherein the intra mode for the portion is implicitly derived from a subset of a set of available intra modes, and not an entirety of the set, by
using the neighboring template data to test a particular intra mode within the subset based upon a least distortion measure from among respective distortion measures,
said least distortion measure being performed for a particular intra mode between predicted values and said neighboring template data,
wherein the predicted values and said neighboring template data correspond to a candidate neighborhood with respect to the portion;
and wherein said neighboring template comprises a neighboring patch with respect to said portion, and
wherein said neighboring patch includes already decoded pixels.

26. The method of claim 25, wherein the intra mode for the portion is implicitly derived using the neighboring template data to test a subset of a set of available intra modes and not an entirety of the set, and a particular intra mode within the subset is selected as the intra mode for the portion based upon a least distortion measure.

27. The method of claim 26, wherein the least distortion measure is determined based upon a sum of absolute difference or a mean square error.

28. The method of claim 26, wherein the subset is determined based upon a function of intra modes used for neighboring blocks.

29. The method of claim 26, wherein the intra mode for the portion is further implicitly derived as a function of intra modes for the neighboring blocks and a best mode for the neighboring template.

30. The method of claim 29, wherein the best mode for the neighboring template is determined by testing several or all intra modes used for the neighboring template, and selecting a given intra mode providing a least distortion measure, from among the several or all intra modes used for the neighboring template, as the best mode for the neighboring template.

31. The method of claim 29, wherein the function is a median function.

32. The method of claim 25, wherein an implicit intra mode derivation is performed for a subset of blocks in a picture, while an explicit intra mode derivation is performed for the other blocks in the picture, the subset of blocks being the portion.

* * * * *